United States Patent
Sayana et al.

(10) Patent No.: US 8,537,658 B2
(45) Date of Patent: Sep. 17, 2013

(54) METHOD OF CODEBOOK DESIGN AND PRECODER FEEDBACK IN WIRELESS COMMUNICATION SYSTEMS

(75) Inventors: Krishna Kamal Sayana, Arlington Heights, IL (US); Xiangyang Zhuang, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 212 days.

(21) Appl. No.: 13/188,419

(22) Filed: Jul. 21, 2011

(65) Prior Publication Data

US 2012/0039251 A1 Feb. 16, 2012

Related U.S. Application Data

(60) Provisional application No. 61/374,241, filed on Aug. 16, 2010.

(51) Int. Cl.
*H04J 13/18* (2011.01)

(52) U.S. Cl.
USPC ........... 370/210; 370/334; 370/328; 370/338; 370/208

(58) Field of Classification Search
USPC ................................. 370/208–210, 328–338
See application file for complete search history.

(56) References Cited

U.S. PATENT DOCUMENTS

| | | | |
|---|---|---|---|
| 7,649,831 B2 | 1/2010 | Van Rensburg et al. | |
| 7,822,140 B2 * | 10/2010 | Catreux et al. | 375/267 |
| 7,885,211 B2 | 2/2011 | Shen et al. | |
| 8,284,849 B2 | 10/2012 | Lee et al. | |
| 2003/0143961 A1 | 7/2003 | Humphreys et al. | |
| 2004/0052314 A1 | 3/2004 | Copeland | |
| 2004/0192398 A1 | 9/2004 | Zhu | |
| 2005/0124393 A1 | 6/2005 | Nuovo et al. | |
| 2005/0250532 A1 | 11/2005 | Hwang et al. | |
| 2006/0067277 A1 | 3/2006 | Thomas et al. | |
| 2006/0292990 A1 | 12/2006 | Karabinis et al. | |
| 2007/0093281 A1 | 4/2007 | Park et al. | |

(Continued)

FOREIGN PATENT DOCUMENTS

| | | |
|---|---|---|
| EP | 1753152 A1 | 2/2007 |
| KR | 10-2005-0058333 A | 6/2005 |

(Continued)

OTHER PUBLICATIONS

United States Patent and Trademark Office, "Final Rejection" for U.S. Appl. No. 12/407,783 dated Feb. 15, 2012, 19 pages.

(Continued)

*Primary Examiner* — Andrew Chriss
*Assistant Examiner* — John Lequang

(57) ABSTRACT

A method for two component feedback in wireless communication systems wherein a wireless communication device sends a first representation of a first matrix chosen from a first codebook, the first matrix is a N-by-N diagonal matrix with the k-th diagonal elements being $\sigma 1 * \exp(j\pi(k-1)m/N)$, for k from 1 to N/2 and being $\sigma 2 * \exp(j\pi(k-N/2-1)m/N)$ for k from N/2+1 to N, N is a number of antennas, m is an integer between 0 and N−1, and $\sigma 1$, $\sigma 2$ are complex valued scalars. The device also sends a second representation of a second N-by-R matrix chosen from a second codebook, with R being a number of spatial layers wherein the first and second representations together convey a precoder matrix as the matrix product of the first and second matrices.

20 Claims, 7 Drawing Sheets

(56) References Cited

U.S. PATENT DOCUMENTS

| | | | |
|---|---|---|---|
| 2007/0211813 | A1 | 9/2007 | Talwar et al. |
| 2007/0232370 | A1 | 10/2007 | Kim |
| 2007/0255558 | A1 | 11/2007 | Yasunaga et al. |
| 2008/0001915 | A1 | 1/2008 | Pihlaja et al. |
| 2008/0080449 | A1* | 4/2008 | Huang et al. .......... 370/342 |
| 2008/0165876 | A1* | 7/2008 | Suh et al. .......... 375/262 |
| 2008/0274753 | A1 | 11/2008 | Attar et al. |
| 2008/0298482 | A1* | 12/2008 | Rensburg et al. .......... 375/260 |
| 2009/0122884 | A1 | 5/2009 | Vook et al. |
| 2010/0023898 | A1 | 1/2010 | Nomura et al. |
| 2010/0034312 | A1 | 2/2010 | Muharemovic et al. |
| 2010/0035627 | A1 | 2/2010 | Hou et al. |
| 2010/0046650 | A1 | 2/2010 | Jongren et al. |
| 2010/0157924 | A1 | 6/2010 | Prasad et al. |
| 2010/0208838 | A1* | 8/2010 | Lee et al. .......... 375/267 |
| 2010/0220801 | A1 | 9/2010 | Lee et al. |
| 2010/0322176 | A1 | 12/2010 | Chen et al. |
| 2011/0051834 | A1* | 3/2011 | Lee et al. .......... 375/267 |
| 2011/0080969 | A1* | 4/2011 | Jongren et al. .......... 375/267 |
| 2011/0216840 | A1* | 9/2011 | Lee et al. .......... 375/259 |

FOREIGN PATENT DOCUMENTS

| | | |
|---|---|---|
| WO | 2004021634 A1 | 3/2004 |
| WO | 2008085107 A2 | 7/2008 |
| WO | 2008113210 A1 | 9/2008 |
| WO | 2008137607 A2 | 11/2008 |
| WO | 2009107090 A1 | 9/2009 |

OTHER PUBLICATIONS

3GPP TSG RAN WG1 #61bis; Beijing, China; Apr. 12-16, 2010; Erisson, ST-Ericsson, "Further Refinements of Feedback Framework" R1-101742, 8 pages.

USPTO Patent Application Titled "Method for Precoding Based on Antenna Grouping" U.S. Appl. No. 12/899,211, filed Oct. 6, 2010.

3GPP TR 36.814 V9.0.0 (Mar. 2010) 3rd Generation Partnership Project; Technical Specification Group Radio Access Network; Further Advancements for E-UTRA Physical Layer Aspects (Release 9), 103 pages.

USPTO Patent Application Titled "Indicator Shelf for Portable Electronic Device" U.S. Appl. No. 12/480,289, filed Jun. 8, 2009.

U.S. Appl. No. 29/329,026, filed Dec. 8, 2008 in the name of Michiel S. Knoppert, et al., entitled "Communication Device" Knoppert, et al. Design Application.

U.S. Appl. No. 29/329,028, filed Dec. 8, 2008 in the name of Michiel S. Knoppert, et al., entitled "Communication Device" Knoppert, et al. Design Application.

Sayana et al., "Method and Precoder Information Feedback in Multi-Antenna Wireless Communication System" U.S. Appl. No. 13/088,237, filed Apr. 15, 2011.

3GPP TSG RAN WG1 #61bis; Dresden, Germany; Jun. 28-Jul. 2, 2010; Samsung, "A feedback framework based on W2W1 for Rel. 10" R1-103664, 19 pages.

3GPP TSG RAN WG1 #61bis; Dresden, Germany; Jun. 28-Jul. 2, 2010; Huawei, "Performance evaluation of adaptive codebook as enhancement of 4 Tx feedback" R1-103447, 4 pages.

3GPP TSG RAN WG1 #61bis; Dresden, Germany; Jun. 28-Jul. 2, 2010; AT&T, "Rationale for mandating simulation of 4Tx Widely-Spaced Cross-Polarized Antenna Configuration for LTE-A MU-MIMO" R1-104184, 6 pages.

3GPP TSG RAN WG4 (Radio) #20, New Jersey, USA; Nov. 12-16, 2001, "UTRAN SFN-SFN observed time difference measurement & 3GPP TS 25.311 IE 10.3.7.106"UE positioning OTDOA neighbour cell info' assistance data fields, Tdoc R4-011408, 4 pages.

USPTO Patent Application Titled "Method for Channel Quality Feedback in Wireless Communication Systems" U.S. Appl. No. 12/823,178, filed Jun. 25, 2010.

3GPP TSG RAN1 #58; Shenzhen, China; Aug. 24-28, 2009, Motorola, "Comparison of PMI-based and SCF-based MU-MIMO" R1-093421, 5 pages.

3GPP TSG RAN WG1 #58; Shenzhen, China Aug. 24-28, 2009, "Implicit feedback in support of downlink MU-MIMO" Texas Instruments; R1-093176, 4 pages.

3GPP TSG RAN WG1 #57bis; Los Angeles, USA; Jun. 29-Jul. 3, 2009, "Feedback considerations for DL MIMO and CoMP" Qualcomm Europe; R1-092695, 6 pages.

3GPP TSG RAN WG1 #60; San Francisco, USA Feb. 22-26, 2010, "Companion Subset Based PMI/CQI Feedback for LTE-A MU-MIMO" RIM; R1-101104; 8 pages.

3GPP TSG RAN WG1 #56; Athens, Greece; Feb. 9-13, 2009, "'Best Companion' reporting for improved single-cell MU-MIMO pairing" Alcatel-Lucent, R1-090926, 28 pages.

IEEE 802.16 Broadband Wireless Access Working Group "IEEE 802.16m System Description Document [Draft]" Nokia, Submitted Feb. 7, 2009, 171 pages.

Syed Ali Jafar, Andrea Goldsmith; "On Optimality of Beamforming for Multiple Antenna Systems with Imperfect Feedback" Department of Electrical Engineering, Stanford University, CA, USA; 7 pages, 2001.

Eugene Visotsky and Upamanyu Madhow; "Space-Time Transmit Precoding With Imperfect Feedback" IEEE Transactions on Inforamtion Theory, vol. 47, No. 6; Sep. 2001, pp. 2632-2639.

USPTO Patent Application Titled "Interference Control SINR Optimization and Signaling Enhancements to Improve the Performance of OTDOA Measurements" U.S. Appl. No. 12/813,221, filed Jun. 10, 2010.

3GPP TSG RAN WG1 #55bis, Ljubljana, Slovenia; Jan. 12-19, 2009, "On OTDOA in LTE" QUALCOMM, R1-090353, 8 pages.

3GPP TSG RAN WG1 #55bis; Ljubljana, Slovenia; Jan. 12-16, 2009, "Improving the hearability of LTE Positioning Service" Alcatel-Lucent, R1-090053, 5 pages.

3GPP TSG RAN #42, Athens, Greece, Dec. 2-5, 2008, "Positioning Support for LTE" Article 39, 3GPP TR 21.900; RP-080995, 6 pages.

Patent Cooperation Treaty, "PCT Invitation to Pay Additional Fees and, where Applicable, Protest Fee" for International Application No. PCT/US2010/038257 Oct. 1, 2010, 9 pages.

Patent Cooperation Treaty, "PCT Search Report and Written Opinion of the International Searching Authority" for International Application No. PCT/US2010/034023 Dec. 1, 2010; 9 pages.

Patent Cooperation Treaty, "PCT Search Report and Written Opinion of the International Searching Authority" for International Application No. PCT/US2010/026579 Feb. 4, 2011, 13 pages.

3GPP TS 36.211 V8.6.0 (Mar. 2009) 3rd Generation Partnership Project; Technical Specification Group Radio Access Network; Evolved Universal Terrestrial Radio Access (E-UTRA); Physical Channels and Modulation (Release 8), 82 pages.

United States Patent and Trademark Office, "Non-Final Rejection" for U.S. Appl. No. 12/823,178 dated Aug. 23, 2012, 16 pages.

Patent Cooperation Treaty, "PCT Search Report and Written Opinion of the International Searching Authority" for International Application No. PCT/US2011/034959 Aug. 16, 2011, 13 pages.

3GPP TSG RAN WG1 #60bis, R1-102380, "DL Codebook design for 8Tx precoding" LG Electronics, Beijing, China, Apr. 12-16, 2010, 4 pages.

3GPP TSG RAN WG1 #60bis, R1-101859, "Development of two-stage feedback framework for Rel-10" Alcatel-Lucent Shanghai Bell, Alcatel-Lucent, Beijing, China Apr. 12-16, 2010, 6 pages.

3GPP TSG RAN WG1 #59bis, R1-100251, "Extensions to Rel-8 type CQI/PMI/RI feedback using double codebook structure" Huawei, Valencia, Spain, Jan. 18-22, 2010, 4 pages.

3GPP TSG RAN1 #61, R1-103328, "Two Component Feedback Design and Codebooks" Motorola, Montreal, Canada, May 10-14, 2010, 8 pages.

Patent Cooperation Treaty, "PCT Search Report and Written Opinion of the International Searching Authority" for International Application No. PCT/US2011/039214 Sep. 14, 2011, 9 pages.

United States Patent and Trademark Office, "Non-Final Rejection" for U.S. Appl. No. 12/407,783 dated Oct. 5, 2011, 15 pages.

Korean Intellectual Property Office, Notice of Preliminary Rejection for Patent Application No. 10-2011-7021719 dated Oct. 9, 2012, 10 pages.

3GPP TSG WG1 #55bis, R1-090328 "Some Results on DL-MIMO Enhancements for LTE-A" Motorola; Ljubjana, Slovenia; Jan. 12-16, 2009, 5 pages.

United States Patent and Trademark Office, "Non-Final Office Action" for U.S. Appl. No. 13/08//237 dated Dec. 19, 2012, 6 pages.

Patent Cooperation Treaty, "PCT Search Report and Written Opinion of the International Searching Authority" for International Application No. PCT/US2011/045209 Oct. 28, 2011, 14 pages.

3GPP TSG RAN WG1 #61bis, R1-103970, "Feedback Codebook Design and Performance Evaluation" LG Electronics, Dresden, Germany, Jun. 28-Jul. 2, 2010, 6 pages.

3GPP TSG RAN WG1 #61bis, R1-103804, "Double codebook design principles" Nokia, Nokia Siemens Networks, Dresden, Germany, Jun. 28-Jul. 2, 2010, 10 pages.

3GPP TSG RAN WG1 #61, R1-103026, "View on the feedback framework for Rel. 10" Samsung, Montreal, Canada, May 10-14, 2010, 16 pages.

3GPP TSG RAN WG1 #60, R1-101219, "Views on Codebook Design for Downlink 8Tx MIMO" NTT DOCOMO, San Francisco, USA, Feb. 22-26, 2010, 10 pages.

3GPP TSG RAN WG1 #60, R1-102904, "Two-Level Codebook design for MU MIMO enhancement" ZTE, Montreal, Canada, May 10-14, 2010, 8 pages.

3GPP TSG RAN WG1 #60, R1-101129, "On Extensions to Rel-8 PMI Feedback" Motorola, San Francisco, USA, Feb. 22-26, 2010, 4 pages.

United States Patent and Trademark Office, "Non-Final Rejection" for U.S. Appl. No. 12/480,289 dated Jun. 9, 2011, 21 pages.

United States Patent and Trademark Office, "Non-Final Rejection" for U.S. Appl. No. 12/899,211 dated May 22, 2013, 18 pages.

* cited by examiner

METHOD OF CODEBOOK DESIGN AND PRECODER FEEDBACK IN WIRELESS COMMUNICATION SYSTEMS

CROSS-REFERENCE TO RELATED APPLICATIONS

The present application claims benefits under 35 U.S.C. 119(e) to U.S. Provisional Application No. 61/374,241 filed on 16 Aug. 2010, the contents of which are incorporated herein by reference.

FIELD OF THE DISCLOSURE

The present disclosure relates generally to wireless communications and, more particularly, to a feedback framework in wireless communication systems.

BACKGROUND

In wireless communication systems, channel state information at a transmitter, for example, at a base station, is important for beam-forming transmissions (also referred to as precoding) that deliver more power to a targeted user while minimizing interference on other users. Precoding operations can be in the context of single-user multiple input multiple output (SU-MIMO) or multi-user MIMO (MU-MIMO), where two or more users are served by a single base station. An eNB needs accurate spatial channel information in order to perform a high rank transmission to a single UE or to perform precoding to two or more UEs simultaneously so that the mutual interference among multiple transmissions can be minimized at each UE.

Precoding operations may also be in the context of SU/MU-MIMO users served by coordinated multi-point (CoMP) transmissions where antennas belonging to different eNBs, rather than to the same eNB, can coordinate their precoding to serve multiple users simultaneously. Further support for up to eight transmit antennas is enabled in the next generation cellular standards like 3GPP LTE Release-10. Due to such a relatively large number of antennas (4-Tx or 8-Tx) involved in such transmissions, it is desirable that the UE feedback be designed efficiently with a good performance overhead trade-off, so that feedback overhead is acceptable with increasing numbers of antennas.

The antenna configurations which support a large number of antennas in practice must allow large beamforming gains and also larger spatial multiplexing gains achieved from higher rank transmission. Beamforming allows efficient support for low geometry users and also for multi-user transmission thereby improving cell-edge and cell-average throughput with larger numbers of users in the system, while spatial multiplexing allows higher peak spectral efficiency. A typical antenna configuration to achieve this would be to have groups of antennas where each group is a set of correlated antennas and each group is uncorrelated with the other groups. A cross-polarized antenna configuration is one such setup. The correlated antenna elements provide the required beamforming gains and the uncorrelated antenna elements enable high rank transmissions.

The above structure in the antennas has some unique spatial characteristics that can be exploited. For example, the correlation among correlated antennas changes slowly and is confined to a smaller vector space on an average. This can be used to feedback the correlated and uncorrelated channel characteristics, i.e., two components, at different rates and/or with different levels of quantization/overhead in time and frequency to reduce feedback overhead. One of the components representing the correlated channel characteristics can be fed back on a wideband basis and/or slowly in time, while the other component is fed back on a subband basis and/or more frequently in time.

However, one of the challenges in designing such a two component feedback system is identifying the parameters used in the two components and the construction of the final precoder matrix as a function of the two components.

The various aspects, features and advantages of the invention will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

Figure 1:
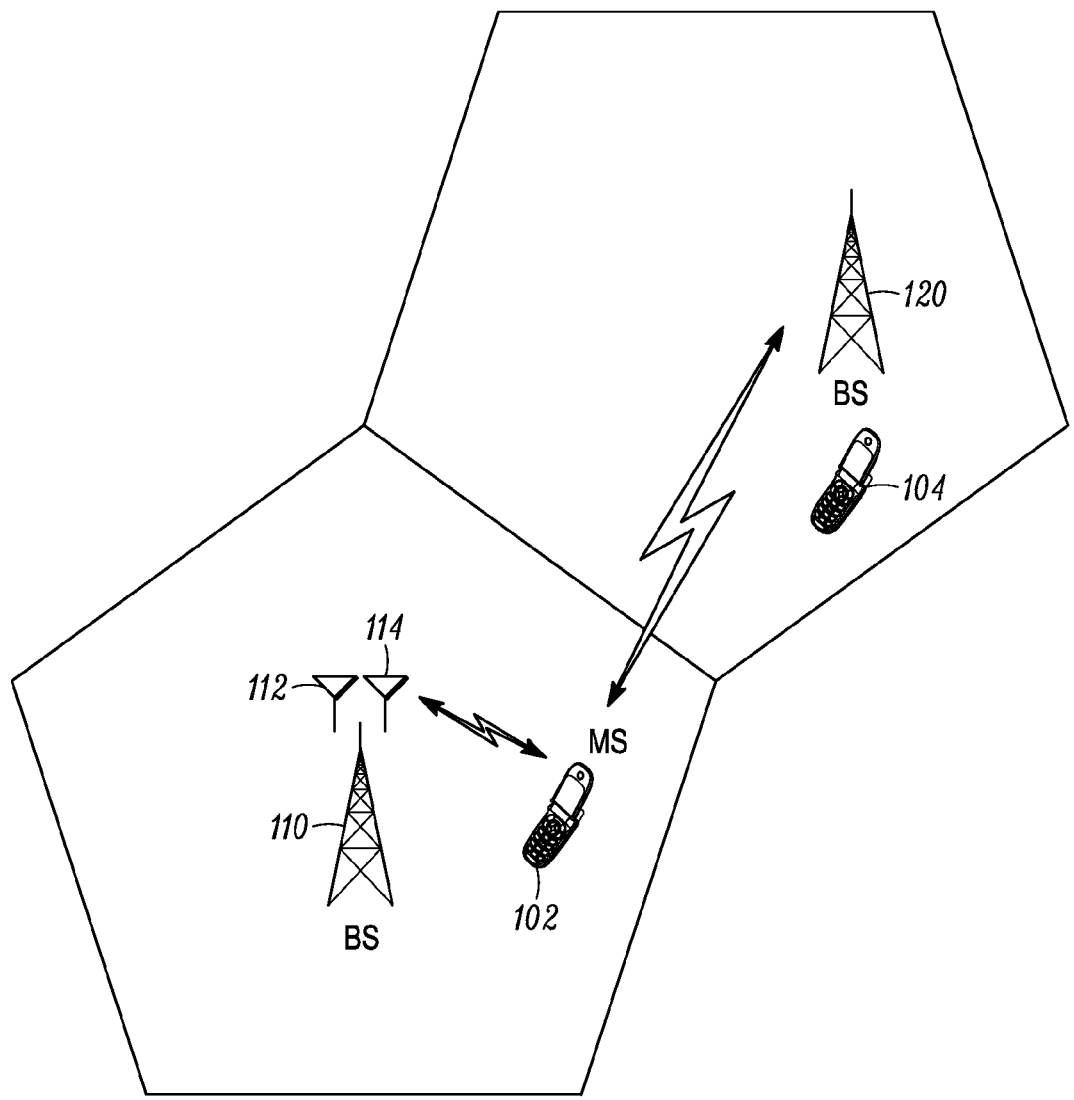
FIG. 1 illustrates a wireless communication system.

In FIG. 1, a wireless communication system 100 comprises one or more fixed base infrastructure units 110 and 120 forming a network distributed over a geographical region for serving remote units in the time and/or frequency domain. The base infrastructure unit may also be referred to as the transmitter, access point (AP), access terminal (AT), base, base station (BS), base unit (BU), Node-B (NB), enhanced Node-B (eNB), Home Node-B (HNB), Home eNB (HeNB) or by other terminology used in the art. The base units are generally part of a radio access network that includes one or more controllers communicably coupled to one or more corresponding base units. The access network is generally communicably coupled to one or more core networks, which may be coupled to other packet or data networks, like the Internet, and to public switched telephone networks (PSTN), among other networks. These and other elements of access and core networks are not illustrated but they are well known generally by those having ordinary skill in the art.

The one or more base units each comprise one or more transmitters for downlink transmissions and one or more receivers for receiving uplink transmissions from the remote units as described further below. The one or more base units serve a number of remote units, for example, remote unit 102 and 104 in FIG. 1, within a corresponding serving area, for example, a cell or a cell sector of the base unit, via a wireless communication link. The remote units may be fixed units or wireless communication devices. The remote unit may also be referred to as a receiver, subscriber station (SS), mobile, mobile station (MS), mobile terminal, user, terminals, user equipment (UE), user terminal (UT) or by other terminology used in the art. The remote units also comprise one or more transmitters and one or more receivers. In FIG. 1, the base unit 110 transmits downlink communication signals to serve remote unit 102 in the time and/or frequency domain. The remote unit 102 communicates directly with base unit 110 via uplink communication signals.

The term "transmitter" is used herein to refer to a source of a transmission intended for receipt by a user or receiver. A transmitter may have multiple co-located antennas each of which emits, possibly different, waveforms based on the same information source. In FIG. 1, for example, antennas 112 and 114 are co-located. A transmitter is typically associated with a cell or a cell sector in the case of a base unit having or serving multiple sectors. Also, if a base unit has geographically separated antennas (i.e., distributed antennas with remote radio heads), the scenario is also referred to as "a transmitter". Thus generally one or more base units transmit information from multiple antennas for reception by a remote unit.

Figure 2:
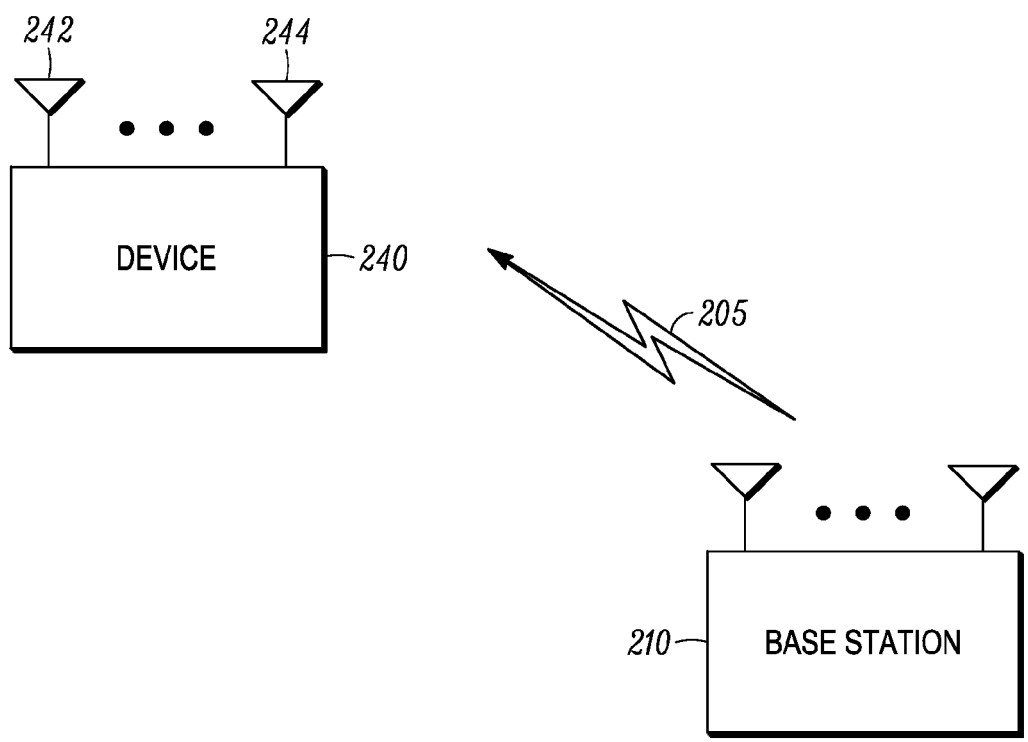
FIG. 2 illustrates an embodiment with a base station transmitting to a device.

In the diagram 200 of FIG. 2, at 210, a base unit transmits from a plurality of antennas. Also in FIG. 2, a remote unit receives transmissions from a plurality of antennas, which may or may not be co-located. In a typical embodiment, a base unit may be associated with a cell-ID, by which it identifies itself to a remote unit. As a conventional mode of operation, also sometimes referred to as a single-point transmission scheme, a remote unit 240 receives transmissions from a plurality of antennas of a single base unit 210. Such a base unit is also referred to as a serving cell (or serving base unit) to the user device/remote unit.

In one implementation, the wireless communication system is compliant with the Third Generation Partnership Project (3GPP) Universal Mobile Telecommunications System (UMTS) Long Term Evolution protocol, also referred to as Evolved Universal Terrestrial Radio Access (EUTRA), or some future generation thereof, wherein the base unit transmits using an orthogonal frequency division multiplexing (OFDM) modulation scheme on the downlink and the user terminals transmit on the uplink using a single carrier frequency division multiple access (SC-FDMA) scheme. In another implementation, the wireless communication system is compliant with the IEEE 802.16 protocol or a future generation thereof. More generally, however, the wireless communication system may implement some other open or proprietary communication protocol where channel feedback is useful or desired. Thus the disclosure is not intended to be limited to or by the implementation of any particular wireless communication system architecture or protocol. The teachings herein are more generally applicable to any system or operation that utilizes multiple antennas in a transmission, whether the multiple antennas belong to a single base unit or to multiple base units or whether the multiple antennas are geographically co-located (e.g., belong to a single base unit) or distributed (belong to either remote radio heads or multiple cells).

In a general embodiment, pilots or reference symbols are sent from each antenna in a transmitter. These pilots occupy the operational bandwidth to allow users to estimate the channel state information (CSI) of the entire bandwidth. Typically the pilots from different antennas are orthogonal so the pilots do not interfere with each other. Such orthogonality can be ensured if the pilots are sent using different time and/or frequency resources or code resources. For example, in systems based on OFDM technology, the pilots can occupy different subcarriers in frequency or different OFDM symbols in time or share the same set of resources, but different code sequences.

Figure 3:
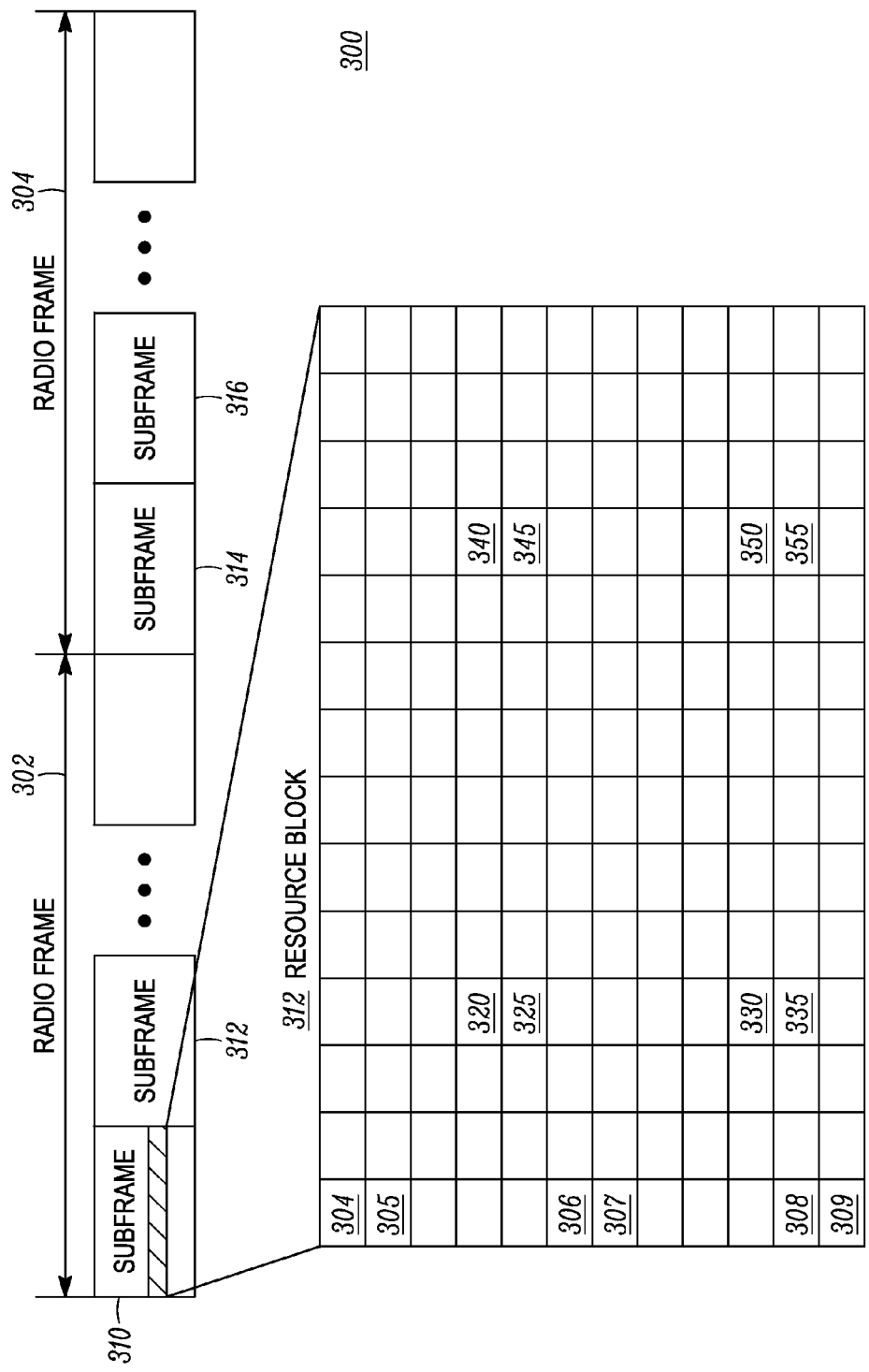
FIG. 3 illustrates an example of a frame structure used in the 3GPP LTE Release-8 (Rel-8) specification and different reference symbols.

FIG. 3 illustrates a frame structure used in the 3GPP LTE Release-8 (Rel-8) protocol to illustrate a possible reference symbol (RS) pattern in an OFDM system. A subframe 310 in a radio frame 302 spans 14 OFDM symbols in time. Further a subframe 310 contains multiple resource blocks 312, each spanning 12 consecutive subcarriers in frequency. In a typical OFDM based system like 3GPP LTE, a block of consecutive OFDM symbols is referred to as a subframe. Each sub-carrier location in each of the OFDM symbols is referred to as a resource element (RE), since a single data modulation symbol can be mapped to such a resource element. A resource block (RB) is defined as a block of REs comprising a set of consecutive sub-carrier locations in frequency and a set of symbols. In LTE Rel-8, a slot is defined to span 7 symbols and each subframe is made of two slots, and hence 14 symbols. A minimum resource unit allocated to a user is the two RBs corresponding to two slots in a subframe for a total of 2×12×7 REs. A resource block may be more generally defined as a set of resource elements/OFDM subcarrier resources in time and frequency domain.

Some of the REs in a RB are reserved for reference symbols (also referred to as pilots) to help in the demodulation and other measurements at the UE. These reference symbols, as defined in the Release 8 specification of LTE can be further divided into two types. The first type is cell-specific reference symbols, which are cell-specific and "common" to all users, and are transmitted in all the RBs. A common reference symbol (CRS) may or may not correspond to actual physical antennas of the transmitter, but CRSs are associated with one or more antenna "ports", either physical or virtual. In FIG. 3, as an example only, RE 304, 305, 306, 307, 308 and 309 may be a CRS. The second type is user-specific or a dedicated reference symbol (DRS), which are user-specific and hence applicable only to that user, and allocated in the RB's allocated to that user's data. Furthermore, DRS typically correspond to "precoded" or beam-formed RSs, which can be directly used by a user for the demodulation of the data streams. The precoding operation is explained later. In FIG. 3, as an example only, RE 320, 325, 330, 335, 340, 345, 350 and 355 may be a DRS. In LTE Release-10, a new spare RS, namely CSI-RS are defined to enable channel measurements, while DRSs are primarily relied upon for demodulation. These can be used similar to CRSs in LTE Release-8 to derive channel feedback information.

The location of the reference symbols is known to the UE from higher layer configurations. For example, depending on the number of antenna ports as configured by a transmission unit, a UE knows the location of all the reference symbols corresponding to all configured antenna ports. As another example, when a UE is instructed to use a DRS, the UE also knows the DRS locations, which may depend on the user identification.

In a typical FDD operation of a LTE Rel-8 system, CRSs are used for both channel related measurements at the UE and also for demodulation. If eNB employs a precoder at the transmitter, such information is made available to the UE, which allows it to construct the channel for demodulation based on the CRSs. In the FDD operation of a future LTE Rel-10 system, CSI-RS (and possibly CRSs that may still be available) may be used for channel related measurements, while DRSs are used for demodulation. Hence an eNB may apply a precoder which is not exactly the same as the UE feedback, and does not have to signal the precoder explicitly. This is further described in detail later.

The "precoding" operation is explained in the following. The base station transmits a signal via weighting each antenna signal with a complex value, an operation referred to as precoding, which may be mathematically represented by the matrix equation:

$$Y = HVs + n$$

in which, when transmitting one spatial layer of data, or rank-1, may be represented as:

$$\begin{bmatrix} y_1 \\ \vdots \\ y_{N_R} \end{bmatrix} = \begin{bmatrix} h_{1,1} & \cdots & y_{1,N_T} \\ \vdots & \ddots & \vdots \\ y_{N_R,1} & \cdots & y_{N_R,N_T} \end{bmatrix} \begin{bmatrix} v_1 \\ \vdots \\ v_{N_R} \end{bmatrix} s + n$$

in which, when transmitting two spatial layers of data, or rank-2, may be represented as:

$$\begin{bmatrix} y_1 \\ \vdots \\ y_{N_R} \end{bmatrix} = \begin{bmatrix} h_{1,1} & \cdots & h_{1,N_T} \\ \vdots & \ddots & \vdots \\ h_{N_R,1} & \cdots & h_{N_R,N_T} \end{bmatrix} \begin{bmatrix} v_{1,1} & v_{1,2} \\ \vdots & \vdots \\ v_{N_T 1} & v_{N_T 1} \end{bmatrix} \begin{bmatrix} s_1 \\ s_2 \end{bmatrix} 1\, n$$

In the example with a rank-1 transmission, or a transmission with one data stream denoted as "s", the Matrix V may be a precoding vector with weights $v_{1,1} \ldots v_{N_T,1}$ for base station transmit antenna #1 to #$N_T$ respectively. In an embodiment with a rank-2 transmission, or a transmission with two data streams s1 and s2 on the same subcarrier, V may be a precoding matrix. Precoding vector and precoding matrix can be referred to as precoding matrix given vector is a degenerated case of matrix.

Matrix H may be the propagation channel matrix between transmit antennas and receive antennas with entry $h_{ij}$ representing a channel between the jth transmit and ith receive antennas. Value n may represent noise and interference. The precoding weights V, either a vector or matrix, may be determined by the base station, typically based on the channel particular to the UE or can be UE-specific and may also take into account a preference indicated by feedback from the UE. Further the matrix HV can be referred to as the effective channel between a user's data streams and its receivers. The effective channel, instead of the propagation channel H, is all a UE needs for demodulation purposes. The precoding weights may or may not be constrained to a predefined codebook that consists of a set of pre-defined vectors or matrices. In an embodiment with constrained precoding, the precoding matrix may be signaled by the base unit efficiently with a precoding matrix index (PMI) or with an index to a precoding matrix within a predefined codebook. The term "matrix" in this context may include the degenerated special case of vector, which applies to single stream transmission. In the most generic sense, the term "precoding" refers to any possible transmission scheme that may be deemed as mapping a set of data streams to an antenna set using a matrix V.

The applied precoding could be based on corresponding feedback from the UE or channel measurements at a base station. In a simple single-user single base unit scheme, one set of DRSs could be defined corresponding to the effective precoded channel (i.e., "HV" in the above equation). If two streams are transmitted to a user in a rank-2 transmission, then only 2 DRS ports (i.e., 2 subsets of DRS each corresponding to a precoded antenna port) are sufficient, even though the actual signal transmission may come from all the $N_T$ antennas at the base unit where $N_T$ can be greater than 2. In FIG. 3, as an example only, RE 320, 340, 330 and 350 may correspond to one DRS port while RE 325, 345, 335 and 355 may correspond to another DRS port.

In a future migration of a system, for example in 3GPP LTE Release 10 and beyond, user-specific RS (or DRS) are expected to be used widely with advanced Multiple-Input Multiple-Output (MIMO) modes like Coordinated Multi-point transmission (CoMP) and multi-user (MU) MIMO modes described earlier. As described earlier, DRSs are sufficient to enable demodulation. This is also helpful since an eNB is not required to signal exact transmission parameters like precoders, co-ordinating points, etc. However, an estimate of the actual (un-precoded or explicit) channel is required at the eNB to derive such transmission parameters. So as mentioned before, feedback measurements for this purpose are enabled in LTE Release-10 by defining lower density reference signals specifically for the purpose of feedback measurements (CSI-RS). Since they do not need to support demodulation, like CRS in LTE Release 8, a lower density is sufficient. Further, with CoMP, CSI-RS may be setup to enable measurements at the user device on a plurality of antennas from multiple base units. In FIG. 3, as an example only, RE 304, 305, 306, 307, 308 and 309 may also be CSI-RS.

From either CRS or CSI-RS, the remote unit receiver can estimate the CSI. For the OFDM example, the receiver estimates CSI at each subcarrier between each receiver antenna and each transmitter antenna. The CSI may be denoted as a channel matrix on a sub-carrier k represented by $$H_k = \begin{bmatrix} h_{11} & h_{12} & \cdots & h_{1Nt} \\ h_{21} & \cdots & \cdots & \cdots \\ \cdots & \cdots & \cdots & \cdots \\ h_{Nr1} & \cdots & \cdots & h_{NrNt} \end{bmatrix}$$

where $h_{ij}$ the channel matrix from jth transmit antenna to the ith receive antenna.

A correlation between antenna port i and antenna port j may be computed as follows $$R = \frac{1}{|S|} \sum_{k \in S} h_{ki}^* h_{kj}$$

where $h_{ki}$ is the channel measured corresponding to antenna port i on subcarrier k, S is a set of subcarriers, typically corresponding to the whole operational bandwidth (denoted as $R_{WB}$) or a sub-band/narrowband (denoted as $R_{NB}$).

More generally, an antenna correlation matrix that represents the spatial covariance among a plurality of transmit antennas can be computed as follows $$R = \frac{1}{|S|} \sum_{k \in S} H_k^H H_k = \begin{bmatrix} R_{11} & \cdots & \cdots & R_{1,Nt} \\ \cdots & \cdots & \cdots & \cdots \\ \cdots & \cdots & \cdots & \cdots \\ R_{Nt,1} & \cdots & \cdots & R_{Nt,Nt} \end{bmatrix}$$

The Eigen Decomposition of R may be expressed in a well-defined format as $$VDV^H \tag{1}$$

where V is a unitary matrix of Eigen vectors, where the first column is the most dominant vector, the second column the second dominant vector and so on. D is a diagonal matrix with diagonal entries as Eigen values of R. The full knowledge of R at the transmitter will enable advanced beamforming/precoding techniques that will improve spectral efficiency and system throughput. However, the overhead may be large and approximations suitable to the transmission mode are applied. For SU-MIMO precoding, the Eigen space information as represented by V above can be viewed as optimal precoding transmission weights in a capacity maximizing sense.

Existing 4$^{th}$ Generation (4G) air interfaces (i.e., 3GPP LTE and IEEE 802.16e) already support beamforming operation via the precoding operation as described earlier. To support precoding operation from the base station, a user terminal will be reporting back to the base station a preferred Precoding Matrix Index (PMI) which is an index to a set of predetermined precoding matrices. The recommended precoding matrix is obtained at the user terminal based on a certain metric such as maximizing the post-precoding link quality or throughput and is selected from one of the quantized codebook entries, wherein the codebook is known to the transmitter and the receiver. Specifically, the standard requires the UE to feedback the PMI that supports a MCS (modulation and coding scheme) with the highest rate, while satisfying a probability if block error target. In future releases, different or more explicit definitions of PMI may be defined. However, in general, the preferred PMI approximately represents a vector quantization of the dominant Eigenspace of R. Furthermore, PMI is fed back with an associated rank and as such PMI is an quantized approximation of V(1:r), where 'r' is the rank.

Figure 4:
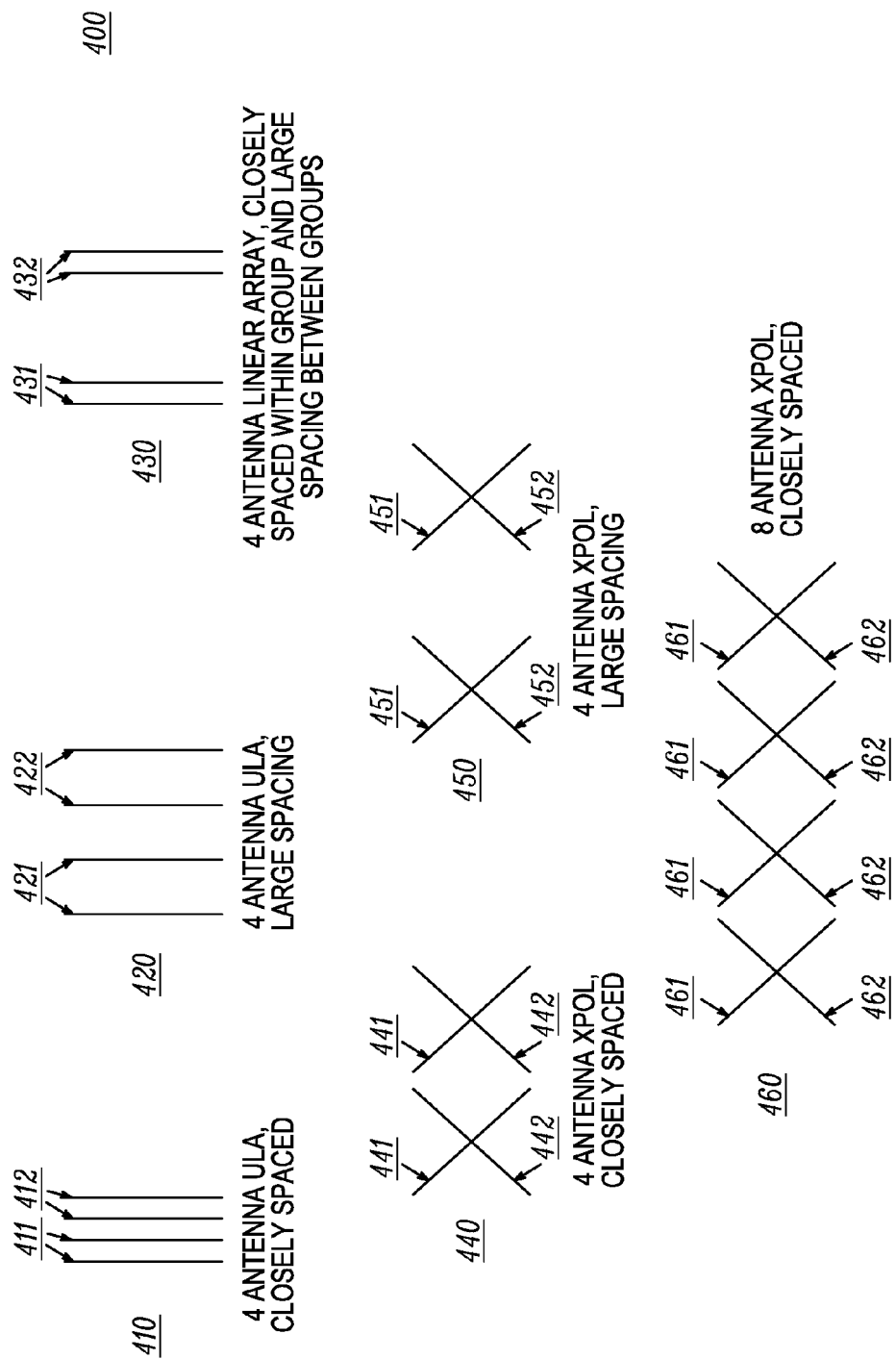
FIG. 4 illustrates exemplary antenna configurations at a base unit.

FIG. 4 illustrates some exemplary antenna configurations at a base unit. A closely spaced 4-Tx uniform linear array (ULA), with a typical spacing of 0.5 to 1 wavelengths, is illustrated in 410. A large spaced 4-Tx ULA with typical spacing of 4 to 10 wavelengths is illustrated in 420. A 4-Tx linear array with small spacing within a group and large spacing between groups is shown in 430. A cross-polarized configuration with two sets of cross-poles each with two antennas at +/−45 polarizations is illustrated in 440 and 450 for small and large spacing 4-Tx antenna, respectively, and also in 460 for a small spacing 8-Tx antenna. We can divide the antenna array into two sub-arrays each with half size, such as 411 and 412, 421 and 422, 431, and 432, 441 and 442, 451 and 452, and 461 and 466. Typically the antenna elements within a sub-array have the same polarization (i.e., co-polarized).

We now illustrate how the structure of the antenna configuration can be used to develop efficient precoder structures.

First, a rank-1 sub-precoder corresponding to a co-polarized sub-array can use a DFT vector chosen from a set of unique DFT vectors (typically referred to as DFT codebook). For example, we can define a size-8 DFT codebook for Ns=2-element sub-array as:

$$\{X_i, i = 0, 1, \ldots, 7\} = \left\{ \begin{bmatrix} 1 \\ 1 \end{bmatrix}, \begin{bmatrix} 1 \\ q_0 \end{bmatrix}, \begin{bmatrix} 1 \\ j \end{bmatrix}, \begin{bmatrix} 1 \\ q_1 \end{bmatrix}, \begin{bmatrix} 1 \\ -1 \end{bmatrix}, \begin{bmatrix} 1 \\ q_2 \end{bmatrix}, \begin{bmatrix} 1 \\ -j \end{bmatrix}, \begin{bmatrix} 1 \\ q_3 \end{bmatrix} \right\}$$

where $$q_i = e^{\frac{j\pi(2i+1)}{4}}, i = 0, 1, 2, 3$$

We can define a size-8 DFT codebook for Ns=4-element sub-array as:

$$\{Z_i, i = 0, 1, \ldots, 7\} = \left\{ \begin{bmatrix} 1 \\ e^{\frac{j\pi i}{4}} \\ e^{\frac{j\pi(2)i}{4}} \\ e^{\frac{j\pi(3)i}{4}} \end{bmatrix}, i = 0, 1, \ldots, 7 \right\}$$

A DFT codebook for size-Ns sub-array contains, for each vector in the codebook, Ns-1 vectors that are orthogonal to that vector. In the above Ns=2 case the $X_i$ and $X_{(i+4) \bmod 8}$ are orthogonal columns. For clarity, we simply denote $X_{(i+4) \bmod 8}$ as $X_{i'4}$ from now. A DFT vector, if used as the antenna weight vector, results in a beam pattern centering at a certain azimuth angle so that the signal arrives at two adjacent elements will have a fixed phase difference, which is 2π/Ns for size-Ns codebook where all vectors are orthogonal. The above size-8 DFT codebook represents an oversampling factor of 4, meaning the vectors in the codebook can resolve phase difference that is 4 times smaller, i.e., π/4 in the Ns=2 example. Similarly, the above size-8 DFT codebook represents an oversampling factor of 2, meaning the vectors in the codebook can resolve phase difference that is 2 times smaller than a size-4 orthogonal DFT codebook (π/4 in the Ns=4 example). A DFT codebook with "oversampling" will have non-orthogonal vectors.

A configuration with N transmit antennas can be deployed as a single ULA array of Ns=N or two ULA sub arrays of Ns=N/2. A codebook defined for such configuration should target both these variations.

It is noted that size-8 4-Tx DFT codebook for 4-Tx ULA configuration can be constructed as $[X_i \; \beta_i X_i]^T$ with a particular choice of $\beta_i = e^{j\pi i/2}$, i=0, 1, ..., 7 which can be viewed as a scaling or co-phasing coefficient when combining the two 2-element sub-precoders into a final 4-element 4-Tx precoder. Such codebook can then be used to perform rank-1 precoding and serves as a rank 1 codebook for 4-Tx ULA. For any 4-Tx antenna configuration (not just ULA), with two 2-element sub-arrays, the rank 1 codebook can be generalized to $[X_i \; \alpha X_i]^T$, where α could capture the optimal co-phasing between the sub-arrays and does not have to satisfy the particular choice of $\alpha = \beta_i$ as for ULA. Together these two constructions can be used to perform rank 1 precoding for both 4-Tx ULA and 4-Tx cross-pol deployments, where a cross-pol is composed of two ULA sub-arrays. Here we refer to $X_i$ corresponding to the first N/2 rows in the overall precoder matrix as a first precoder sub-matrix and $\alpha X_i$ (or $\beta_i X_i$) corresponding to second N/2 rows as a second precoder sub-matrix. Further, as described above $X_i$ is referred to as a sub-precoder, in that it captures the ULA sub-array combining.

Figure 5:
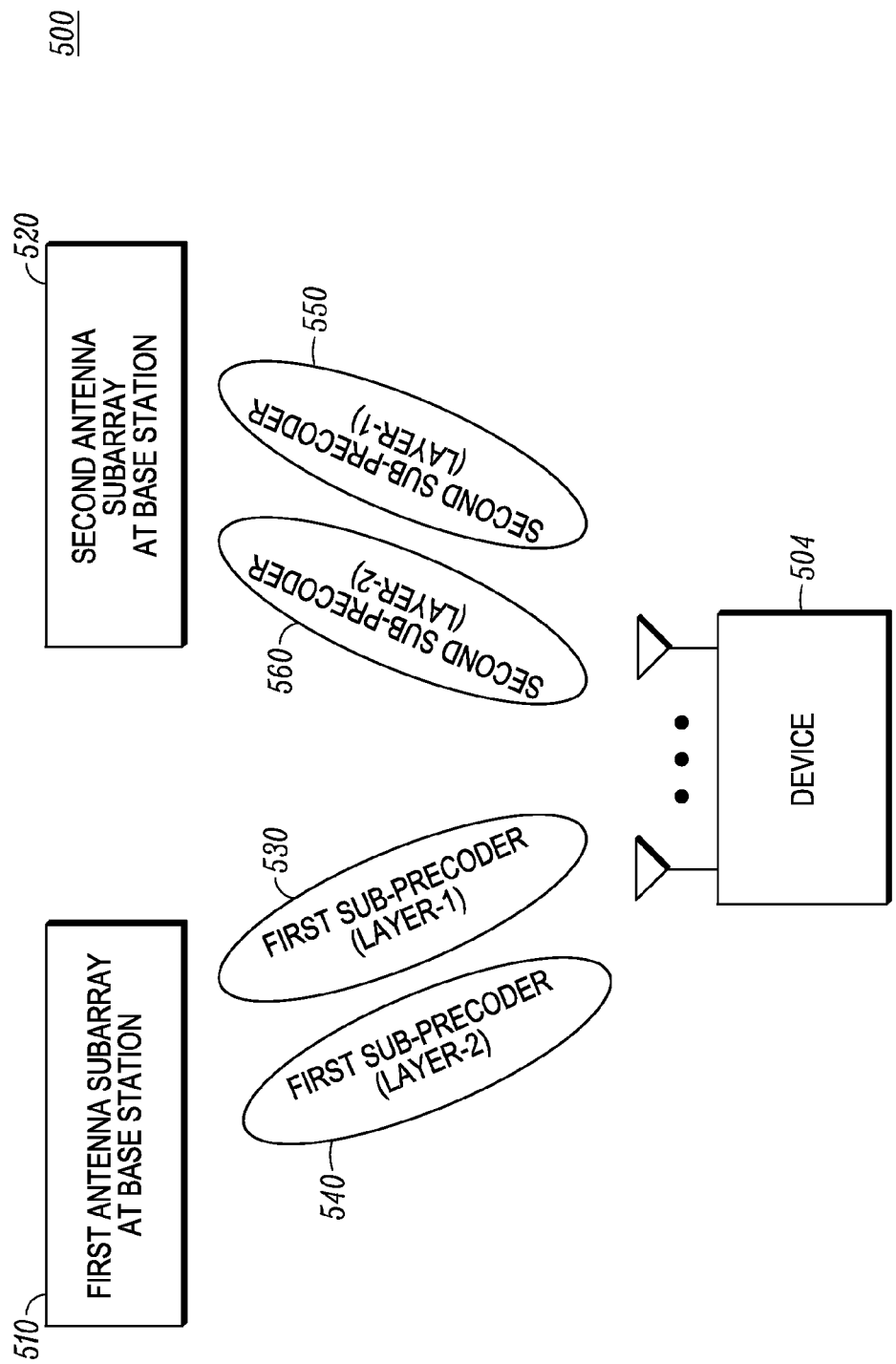
FIG. 5 illustrates a first subset of antennas and a second subset of antennas transmitting two spatial layers to a device.

The rank 1 codebook construction described above can be extended to higher ranks (or equivalently number of spatial layers transmitted/hypothesized). FIG. 5 further illustrates a precoding operation from two antenna sub-arrays 510, 520 that are weighted by a first and a second precoder sub-matrices, respectively. Both precoder sub-matrices are formed from one or more sub-precoders. The final precoder matrix is the combination of the first and second sub-matrices. Each sub-matrix corresponds to one or more spatial layers of data transmission for the corresponding sub-array. For example, in FIG. 5 the first precoder sub-matrix contains a sub-precoder for spatial layer 1 (530) and a sub-precoder for layer-2 (540). Similarly the second precoder sub-matrix has two sub-precoders for two spatial layers. The final precoder vector for layer-1 is the concatenation of 530 and 550, and for layer-2 is a concatenation of 540 and 560.

We now use the example 4×2 precoder matrices (i.e., N=4 and two spatial layers) to show how the precoder matrix can be constructed from two rank-1 "sub-precoder" vectors X,Y, corresponding to the 2-element co-polarized sub-arrays, which could belong to a length 2 DFT codebook described above. At least the following structures can be useful when constructing the final precoder, as explained in the table below.

$$U_k = \begin{bmatrix} 1 & 0 & 0 & 0 \\ 0 & e^{\frac{j\pi(k-2)}{8}} & 0 & 0 \\ 0 & 0 & e^{\frac{j\pi(k-2)\cdot 2}{8}} & 0 \\ 0 & 0 & 0 & e^{\frac{j\pi(k-2)\cdot 3}{8}} \end{bmatrix}, k = 1, 2, 3$$

In a preferred embodiment, the final precoder matrix W can be constructed as below based on the sub-precoder $X_i$. Note

| Structure | Comments |
|---|---|
| $\begin{bmatrix} X & X \\ \alpha X & -\alpha X \end{bmatrix}$ : Same sub-precoder X is chosen for the two sub-arrays. | Usually useful for ULA, in which case rank-1 transmission happens often (i.e., only first column is used as the precoder) with the scaling factor $\alpha$ applied on the second sub-precoder also determined in a way such as $[X\ aX]^T$ is a DFT vector. Can also happen quite often in rank-2 for both ULA and X-pol, in which dcase the two columns are orthogonal by construction and $\alpha$ is a co-phasing factor |
| $\begin{bmatrix} X & Y \\ \alpha X & \beta Y \end{bmatrix}$ : Same sub-precoder for the two subarrays on the same layer, but different among layers. | Useful to ULA, either rank-1 (same as above) or rank-2 in which case sub-precoder X and Y are typical orthogonal and $\alpha$ and $\beta$ are also chosen to ensure orthogonal columns in the final precoder matrix Can be useful to X-pol, in which case the second spatial layer is enabled in the correlation domain from the co-polarized subarray, instead of in the polarization domain. |
| $\begin{bmatrix} X & Y \\ \alpha Y & \beta X \end{bmatrix}$ | Often useful to X-pol in which case both sub-precoder X and Y are good to use for each subarray. For the first layer, when one subarrary chooses X, the other subarray chooses Y. For the second layer, the first subarray changes to Y and the second one changes to X. |
| $\begin{bmatrix} X & X \\ \alpha Y & \beta Y \end{bmatrix}$ | Maybe useful sometimes to X-pol in which case both sub-precoder X and Y are good to use, but the first subarrary always prefers X for both spatial layers and the other subarray always prefers Y for both layers. |

From the above discussion on how to construct the final precoder from a rank-1 sub-precoder chosen from one of the DFT codebook, one can see that the construction structure and relative weighting or co-phasing factor often depend on the antenna configuration. They also depend on the short-term subband behavior within a frequency band as will be seen more clearly later.

On the other hand, spatial correlation exhibited from the co-polarized sub-array changes slowly over time and often varies very slightly from sub-band to sub-band. The sub-precoder, which often approximates the eigenvectors of the spatial covariance matrix, is also more stable. Hence, the sub-precoder information can be fed back less often, as opposed to the construction structure and relative weighting factor that may vary from sub-band to sub-band.

In a preferred embodiment, the sub-precoder can be further refined on a sub-band basis via a N/2-by-N/2 diagonal rotation matrix. For example, three rotation matrices $\{T_k, k=1, 2, 3\}$ can be defined to be applied on $X_i$ $$T_k = \begin{bmatrix} 1 & 0 \\ 0 & e^{\frac{j\pi(k-2)}{8}} \end{bmatrix}, k = 1, 2, 3$$

In essence, $T_k$ allows further phase rotation of $+/-\pi/8$ in addition to no rotation for the 2-element sub-array. To refine the DFT codebook for 4-Tx ULA, we can also introduce three rotation matrices $\{U_k, k=1, 2, 3\}$, to allow rotation of $+/-\pi/8$ in addition to no rotation.

that the W given below is for rank 1~4 with a nested property, so the precoder for rank-m (m<4) is simply formed taking a m columns as a subset of 4 columns of W, denoted as W(:,1:m). For rank-1 and rank-2, they could simply be obtained as first column and first two-columns of the rank 4 precoder. For rank 3, a predefined column subset is used for each second index.

| Second Index | Final precoder W (up to rank 4) |
|---|---|
| 1 2 | $U_k \begin{bmatrix} X_i & X_{i+4} & X_i & X_{i+4} \\ \beta_i X_i & -\beta_i X_{i+4} & -\beta_i X_i & \beta_i X_{i+4} \end{bmatrix}$, |
| 3 | $k \in \{1, 2, 3\}; \beta_i = e^{\frac{j\pi i}{2}}$ |
| 4 | |
| 5 | |
| 6 | |
| 7 | |
| 8 | |
| 9 | |
| 10 | |
| 11 | |
| 12 | |
| 13 14 | $\begin{bmatrix} X_i & X_{i+2} & X_{i+4} & X_{i-2} \\ \alpha X_{i+2} & -j\alpha X_i & -\alpha X_{i-2} & j\alpha X_{i+4} \end{bmatrix}$ |
| 15 16 | $\alpha \in \{\pm 1, \pm j\}$ |

The subband codebook includes structures that are suitable for both cross-poles and ULA. The first 3 indices are mainly used for refining subband feedback for ULA.

Subband codebook indices 4 through 12 mainly target cross-pole, allowing also rotation to sub-precoders using three rotation matrices, together with also three co-phasing factors to combine the two sub-precoders (the same 2×1 vector) corresponding to the two sub-arrays with different polarization. Compared to the 4-Tx ULA scenario that the special co-phasing factor $\beta_i$ is tied to $X_i$, independent co-phasing factors can be chosen from three values here. The reason that $\alpha=\beta_i$ is not included is that this structure is already included in the previous three matrices targeting ULA.

Subband codebook indices 13-16 also target cross-pole and allow four co-phasing vectors $\alpha \in \{\pm 1, \pm j\}$ for combining sub-precoders, while achieving rank 2 orthogonality. However, this structure does not strictly force orthogonality of columns for the sub-precoder matrices and allows use of different sub-precoders in a single column. For the first layer, when one sub-array chooses $X_i$, the other sub-array chooses $X_{i+2}$. For the second layer, the first sub-precoder changes to $X_{i+2}$ while the second sub-precoder changes to $X_i$.

More generally, the overall precoder may be formed from DFT sub-precoders Xi, where each sub-matrix corresponding to a spatial layer may be expressed as $\gamma_i X_{i+n}$. The particular constructions chosen here are based on the most common practical deployments.

Even though we gave the final W from the sub-precoder $X_i$ directly, we can represent the final W more efficiently in a product form as $W=W_1 W_2$. In one example, the first matrix $W_1$ for 4-Tx case can be defined as:

$$W_1 \in \left\{ \begin{bmatrix} 1 & 0 & 0 & 0 \\ 0 & e^{\frac{j\pi i}{4}} & 0 & 0 \\ 0 & 0 & e^{\frac{j\pi 2i}{4}} & 0 \\ 0 & 0 & 0 & e^{\frac{j\pi 3i}{4}} \end{bmatrix} = \begin{bmatrix} \text{diag}(X_i) & 0 \\ 0 & \beta_i \text{diag}(X_i) \end{bmatrix}, \; i=0,1,2,\ldots 7 \right\}$$

Which is a N-by-N diagonal matrix with the k-th diagonal elements being $\sigma^* \exp(j\pi(k-1)m/N)$, N being the number of antennas, m being an integer chosen between 0 and N−1 by the wireless communication device, and σ being a complex valued constant including "1". The diagonal elements of the first matrix are also a DFT vector of length-N.

The diagonal element of the first matrix is also the concatenation of a sub-precoder, i.e., a first DFT vector of length-N/2, and a scaled version of a sub-precoder, i.e., a second DFT vector of length-N/2, where in the scaling can be a complex value including "1". Generalizing the first precoder can be defined as N-by-N diagonal matrix with the k-th diagonal elements being $\sigma 1^* \exp(j\pi(k-1)m/N)$, for k from 1 to N/2 and being $\sigma 2^* \exp(j\pi(k-N/2-1)m/N)$ for k from N/2+1 to N, N being the number of antennas, m being an integer chosen between 0 and N−1 by the wireless communication device, and σ1, σ2 being complex valued scalars. Clearly, in the above embodiment, σ1=1 and σ2=$\beta_i$.

In one example corresponding to the W1 defined in [00062], $W_2$ has 16 matrices as given in the table below, which results in the same codebook described in [00058]. Even though $W=W_1 W_2$ is a function of $X_i$, it can be shown that $W_2=W_1^H W$ will actually results in a $W_2$ that is fixed and independent from $W_1$

| Index | W2 |
|---|---|
| 1 | $\begin{bmatrix} 1 & 1 & 1 & 1 \\ e^{\frac{-j\pi}{8}} & -e^{\frac{-j\pi}{8}} & e^{\frac{-j\pi}{8}} & -e^{\frac{-j\pi}{8}} \\ e^{\frac{-j\pi}{4}} & -e^{\frac{-j\pi}{4}} & -e^{\frac{-j\pi}{4}} & e^{\frac{-j\pi}{4}} \\ e^{\frac{-j3\pi}{8}} & e^{\frac{-j3\pi}{8}} & -e^{\frac{-j3\pi}{8}} & -e^{\frac{-j3\pi}{8}} \end{bmatrix}$ |
| 2 | $\begin{bmatrix} 1 & 1 & 1 & 1 \\ 1 & -1 & 1 & -1 \\ 1 & -1 & -1 & 1 \\ 1 & 1 & -1 & -1 \end{bmatrix}$ |
| 3 | $\begin{bmatrix} 1 & 1 & 1 & 1 \\ e^{\frac{j\pi}{8}} & -e^{\frac{j\pi}{8}} & e^{\frac{j\pi}{8}} & -e^{\frac{j\pi}{8}} \\ e^{\frac{j\pi}{4}} & -e^{\frac{j\pi}{4}} & -e^{\frac{j\pi}{4}} & e^{\frac{j\pi}{4}} \\ e^{\frac{j3\pi}{8}} & e^{\frac{j3\pi}{8}} & -e^{\frac{j3\pi}{8}} & -e^{\frac{j3\pi}{8}} \end{bmatrix}$ |
| 4 | $\begin{bmatrix} 1 & 1 & 1 & 1 \\ e^{\frac{-j\pi}{8}} & e^{\frac{-j\pi}{8}} & -e^{\frac{-j\pi}{8}} & -e^{\frac{-j\pi}{8}} \\ j & -j & j & -j \\ e^{\frac{j3\pi}{8}} & -e^{\frac{j3\pi}{8}} & -e^{\frac{j3\pi}{8}} & e^{\frac{j3\pi}{8}} \end{bmatrix}$ |
| 5 | $\begin{bmatrix} 1 & 1 & 1 & 1 \\ e^{\frac{-j\pi}{8}} & e^{\frac{-j\pi}{8}} & -e^{\frac{-j\pi}{8}} & -e^{\frac{-j\pi}{8}} \\ -1 & 1 & -1 & 1 \\ -e^{\frac{-j\pi}{8}} & e^{\frac{-j\pi}{8}} & e^{\frac{-j\pi}{8}} & -e^{\frac{-j\pi}{8}} \end{bmatrix}$ |

| Index | W2 |
|---|---|
| 6 | $\begin{bmatrix} 1 & 1 & 1 & 1 \\ e^{-\frac{j\pi}{8}} & e^{-\frac{j\pi}{8}} & -e^{-\frac{j\pi}{8}} & -e^{-\frac{j\pi}{8}} \\ -j & j & -j & j \\ -e^{\frac{j3\pi}{8}} & e^{\frac{j3\pi}{8}} & e^{\frac{j3\pi}{8}} & -e^{\frac{j3\pi}{8}} \end{bmatrix}$ |
| 7 | $\begin{bmatrix} 1 & 1 & 1 & 1 \\ 1 & 1 & -1 & -1 \\ j & -j & j & -j \\ j & -j & -j & j \end{bmatrix}$ |
| 8 | $\begin{bmatrix} 1 & 1 & 1 & 1 \\ 1 & 1 & -1 & -1 \\ -1 & 1 & -1 & 1 \\ -1 & 1 & 1 & -1 \end{bmatrix}$ |
| 9 | $\begin{bmatrix} 1 & 1 & 1 & 1 \\ 1 & 1 & -1 & -1 \\ -j & j & -j & j \\ -j & j & j & -j \end{bmatrix}$ |
| 10 | $\begin{bmatrix} 1 & 1 & 1 & 1 \\ e^{\frac{j\pi}{8}} & e^{\frac{j\pi}{8}} & -e^{\frac{j\pi}{8}} & -e^{\frac{j\pi}{8}} \\ j & -j & j & -j \\ -e^{-\frac{j3\pi}{8}} & e^{-\frac{j3\pi}{8}} & e^{-\frac{j3\pi}{8}} & -e^{-\frac{j3\pi}{8}} \end{bmatrix}$ |
| 11 | $\begin{bmatrix} 1 & 1 & 1 & 1 \\ e^{\frac{j\pi}{8}} & e^{\frac{j\pi}{8}} & -e^{\frac{j\pi}{8}} & e^{\frac{j\pi}{8}} \\ -1 & 1 & -1 & 1 \\ -e^{\frac{j\pi}{8}} & e^{\frac{j\pi}{8}} & e^{\frac{j\pi}{8}} & -e^{\frac{j\pi}{8}} \end{bmatrix}$ |
| 12 | $\begin{bmatrix} 1 & 1 & 1 & 1 \\ e^{\frac{j\pi}{8}} & e^{\frac{j\pi}{8}} & -e^{\frac{j\pi}{8}} & -e^{\frac{j\pi}{8}} \\ -j & j & -j & j \\ e^{-\frac{j3\pi}{8}} & -e^{-\frac{j3\pi}{8}} & -e^{-\frac{j3\pi}{8}} & e^{-\frac{j3\pi}{8}} \end{bmatrix}$ |
| 13 | $\begin{bmatrix} 1 & 1 & 1 & 1 \\ 1 & j & -1 & -j \\ 1 & -j & -1 & j \\ j & -j & j & -j \end{bmatrix}$ |
| 14 | $\begin{bmatrix} 1 & 1 & 1 & 1 \\ 1 & j & -1 & -j \\ j & 1 & -j & -1 \\ -1 & 1 & -1 & 1 \end{bmatrix}$ |
| 15 | $\begin{bmatrix} 1 & 1 & 1 & 1 \\ 1 & j & -1 & -j \\ -1 & j & 1 & -j \\ -j & j & -j & j \end{bmatrix}$ |
| 16 | $\begin{bmatrix} 1 & 1 & 1 & 1 \\ 1 & j & -1 & -j \\ -j & -1 & j & 1 \\ 1 & -1 & 1 & -1 \end{bmatrix}$ |

Each entry of the second matrix can be represented as $\exp\{j\pi p/(2N)\}$ where p is an integer between 0 and $2N-1$. Note that one can represent the final precoder W as:

$$W =$$

$$W_1 W_2 = \begin{bmatrix} \operatorname{diag}\{X_i\} W_2(1:2,1) & \operatorname{diag}\{X_i\} W_2(1:2,2) & \operatorname{diag}\{X_i\} W_2(1:2,3) & \operatorname{diag}\{X_i\} W_2(1:2,4) \\ \beta_i \operatorname{diag}\{X_i\} W_2(3:4,1) & \beta_i \operatorname{diag}\{X_i\} W_2(3:4,1) & \beta_i \operatorname{diag}\{X_i\} W_2(3:4,3) & \beta_i \operatorname{diag}\{X_i\} W_2(3:4,4) \end{bmatrix}$$

$$= \begin{bmatrix} \operatorname{diag}\{W_2(1:2,1)\} X_i & \operatorname{diag}\{W_2(1:2,2)\} X_i & \operatorname{diag}\{W_2(1:2,4)\} & \operatorname{diag}\{W_2(1:2,4)\} X_i \\ \beta_i \operatorname{diag}\{W_2(3:4,1)\} X_i & \beta_i \operatorname{diag}\{W_2(3:4,1)\} X_i & \beta_i \operatorname{diag}\{W_2(3:4,3)\} X_i & \beta_i \operatorname{diag}\{W_2(3:4,4)\} X_i \end{bmatrix}$$

Where diag $\{W_2(1:2,1)\}X_i$ represents the rotation operation on sub-precoder $X_i$ by a diagonal formed from the first two entries of the column of $W_2$.

With this observation, one can see that a sub-precoder, i.e., a first DFT vector of length N/2, are further rotated by entries in the first N/2 rows of the second matrix $W_2$ to obtain a first sub-matrix corresponding to N/2 antenna elements, wherein each column corresponds to each of R spatial layers; and a second DFT vector of length N/2 (i.e., $\beta_i X_i$ in this example) are further rotated by entries of the last N/2 rows of the second matrix entries to obtain a second sub-matrix corresponding to rest N/2 antenna elements, wherein each column corresponds to each of R spatial layers; and the final precoder matrix is the concatenation of the first and second sub-matrices.

Since the wireless communication device selects the $W_2$, it can select the second matrix so that the first sub-matrix contains orthogonal columns (see $W_2$ index #4-12) or non-orthogonal columns (see $W_2$ index 13-16). It can also select $W_2$ so that the first sub-matrix and second sub-matrix corresponding to the same spatial layer (i.e., same column) is equivalent, up to a linear scaling (see $W_2$ index #1-12), or different (see $W_2$ index #13-16). It can also select $W_2$ so that at least two columns of the first sub-matrix corresponding to at least two different spatial layers are the same (see $W_2$ index #4-12). It can also select $W_2$ so that at least one column of the second sub-matrix corresponding to a spatial layer is the negation of another column of the second sub-matrix corresponding to another spatial layer (see $W_2$ index #4-12). It can also select $W_2$ so that the precoder matrix contains orthogonal columns.

Figure 6:
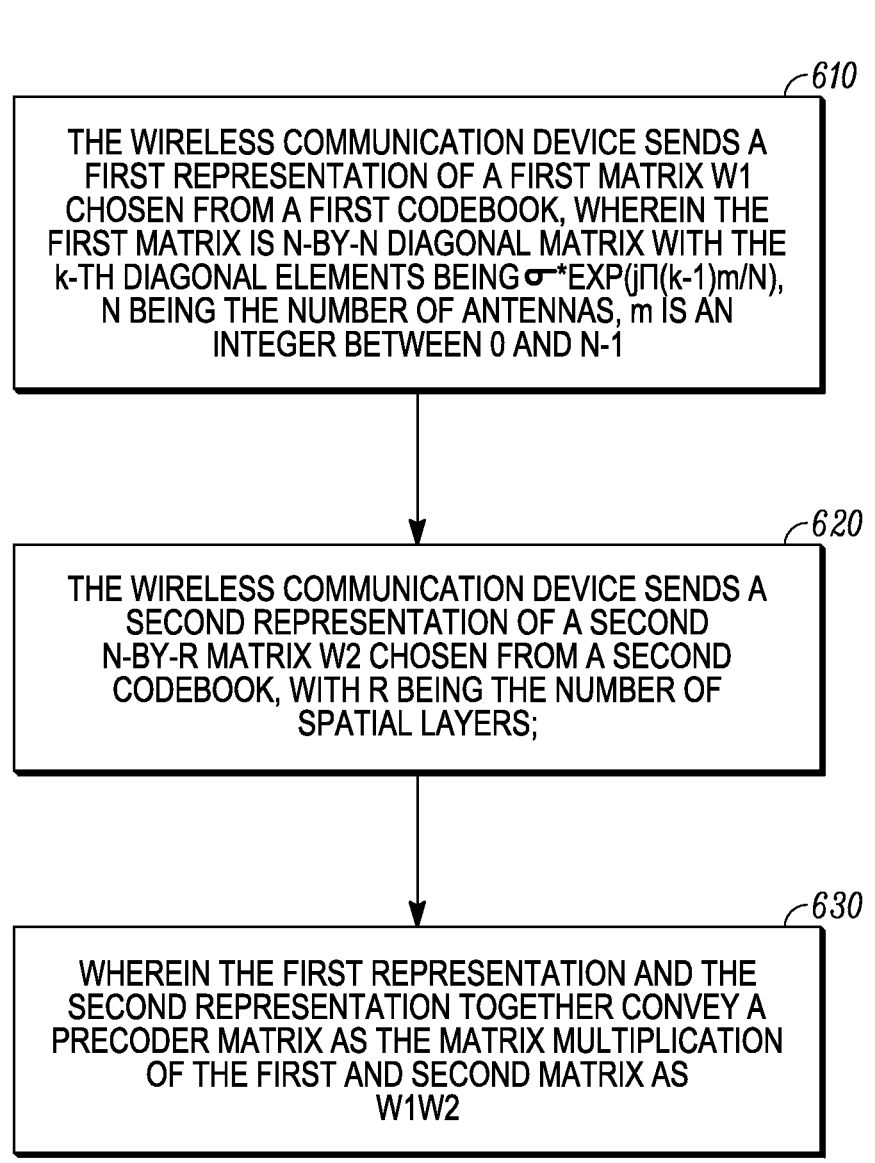
FIG. 6 illustrates an exemplary two component feedback scheme to derive a precoder matrix based on matrix multiplication of two component matrices.

FIG. 6 shows a preferred embodiment of precoder determination based on matrix multiplication W1W2, as described previously. In 610, the wireless communication device sending a first representation of a first matrix W1 chosen from a first codebook, wherein the first matrix is N-by-N diagonal matrix with the k-th diagonal elements being $\sigma^* \exp(j\pi(k-1)m/N)$, N being the number of antennas, m is an integer between 0 and N−1. In 620, the wireless communication device sending a second representation of a second N-by-R matrix W2 chosen from a second codebook, with R being the number of spatial layers; wherein the first representation and the second representation together convey a precoder matrix as the matrix multiplication of the first and second matrices as W1W2.

In the example of 8-Tx codebook design, the first matrix $W_1$ for 4-element sub-array can be defined as:

$$W_1 \in \left\{ \begin{bmatrix} \text{diag}(X_i) & 0 \\ 0 & \beta_i \text{diag}(X_i) \end{bmatrix}, i = 0, 1, 2, \ldots 15 \right\}$$

where $$\beta_i = e^{\frac{j\pi i}{2}}, i = 0, 1, \ldots, 15$$

Where the size-16 4-element sub-array DFT codebook is defined as:

$$\{X_i, i = 0, 1, \ldots, 15\} = \left\{ \begin{bmatrix} 1 \\ e^{\frac{j\pi i}{8}} \\ e^{\frac{j\pi(2)i}{8}} \\ e^{\frac{j\pi(3)i}{8}} \end{bmatrix}, i = 0, 1, \ldots 15 \right\}$$

Similar to 4-Tx, W can be constructed as follows where $X_{i+m}$ is addition modulo 16.

| Second Index | W (up to rank 4) |
|---|---|
| 1<br>2<br>3 | $U_k \begin{bmatrix} X_i & X_{i+8} & X_i & X_{i+8} \\ \beta_i X_i & -\beta_i X_{i+8} & -\beta_i X_i & \beta_i X_{i+8} \end{bmatrix}$,<br><br>$k \in \{1, 2, 3\}; \beta_i = e^{\frac{j\pi i}{2}}$ |
| 4<br>5<br>6<br>7 | $\begin{bmatrix} T_k X_i & T_k X_i & T_k X_{i+8} & T_k X_{i+8} \\ \alpha T_k X_i & -\alpha T_k X_i & \alpha T_k X_{i+8} & -\alpha T_k X_{i+8} \end{bmatrix}$,<br><br>$k \in \{1, 2, 3\}; \alpha \in \{\beta_i \times [+j, -1, -j]\}$ |
| 8<br>9<br>10<br>11<br>12 | |
| 13<br>14<br>15 | $\begin{bmatrix} X_i & X_{i+4} & X_{i+8} & X_{i-4} \\ \alpha X_{i+4} & -j\alpha X_i & -\alpha X_{i-4} & j\alpha X_{i+8} \end{bmatrix}$ |
| 16 | $\alpha \in \{\pm 1, \pm j\}$ |

A size-16 example codebook for $W_2$ is given below to support rank 1~4 as described before:

| Index | W2 |
|---|---|
| 1 | $\begin{bmatrix} 1 & 1 & 1 & 1 \\ e^{-j\pi/16} & -e^{-j\pi/16} & e^{-j\pi/16} & -e^{-j\pi/16} \\ e^{-j\pi/8} & -e^{-j\pi/8} & e^{-j\pi/8} & -e^{-j\pi/8} \\ e^{-j3\pi/16} & -e^{-j3\pi/16} & e^{-j3\pi/16} & -e^{-j3\pi/16} \\ e^{-j\pi/4} & -e^{-j\pi/4} & -e^{-j\pi/4} & e^{-j\pi/4} \\ e^{-j5\pi/16} & e^{-j5\pi/16} & -e^{-j5\pi/16} & -e^{-j5\pi/16} \\ e^{-j3\pi/8} & -e^{-j3\pi/8} & -e^{-j3\pi/8} & e^{-j3\pi/8} \\ e^{-j7\pi/16} & e^{-j7\pi/16} & -e^{-j7\pi/16} & -e^{-j7\pi/16} \end{bmatrix}$ |
| 2 | $\begin{bmatrix} 1 & 1 & 1 & 1 \\ 1 & -1 & 1 & -1 \\ 1 & 1 & 1 & 1 \\ 1 & -1 & 1 & -1 \\ 1 & -1 & -1 & 1 \\ 1 & 1 & -1 & -1 \\ 1 & -1 & -1 & 1 \\ 1 & 1 & -1 & -1 \end{bmatrix}$ |

-continued

| Index | W2 |
|---|---|
| 3 | $\begin{bmatrix} 1 & 1 & 1 & 1 \\ e^{j\pi/16} & -e^{j\pi/16} & e^{j\pi/16} & -e^{j\pi/16} \\ e^{j\pi/8} & e^{j\pi/8} & e^{j\pi/8} & e^{j\pi/8} \\ e^{j3\pi/16} & -e^{j3\pi/16} & e^{j3\pi/16} & -e^{j3\pi/16} \\ e^{j\pi/4} & -e^{j\pi/4} & -e^{j\pi/4} & e^{j\pi/4} \\ e^{j5\pi/16} & e^{j5\pi/16} & -e^{j5\pi/16} & -e^{j5\pi/16} \\ e^{j3\pi/8} & -e^{j3\pi/8} & -e^{j3\pi/8} & e^{j3\pi/8} \\ e^{j7\pi/16} & e^{j7\pi/16} & -e^{j7\pi/16} & -e^{j7\pi/16} \end{bmatrix}$ |
| 4 | $\begin{bmatrix} 1 & 1 & 1 & 1 \\ e^{-j\pi/16} & e^{-j\pi/16} & -e^{-j\pi/16} & -e^{-j\pi/16} \\ e^{-j\pi/8} & -e^{-j\pi/8} & e^{-j\pi/8} & -e^{-j\pi/8} \\ e^{-j3\pi/16} & -e^{-j3\pi/16} & -e^{-j3\pi/16} & e^{-j3\pi/16} \\ j & -j & j & -j \\ e^{j7\pi/16} & -e^{j7\pi/16} & -e^{j7\pi/16} & e^{j7\pi/16} \\ e^{j3\pi/8} & -e^{j3\pi/8} & e^{j3\pi/8} & -e^{j3\pi/8} \\ e^{j5\pi/16} & e^{j5\pi/16} & -e^{j5\pi/16} & e^{j5\pi/16} \end{bmatrix}$ |
| 5 | $\begin{bmatrix} 1 & 1 & 1 & 1 \\ e^{-j\pi/16} & e^{-j\pi/16} & -e^{-j\pi/16} & -e^{-j\pi/16} \\ e^{-j\pi/8} & e^{-j\pi/8} & -e^{-j\pi/8} & e^{-j\pi/8} \\ e^{-j3\pi/16} & e^{-j3\pi/16} & -e^{-j3\pi/16} & -e^{-j3\pi/16} \\ -1 & 1 & -1 & 1 \\ -e^{-j\pi/16} & e^{-j\pi/16} & e^{-j\pi/16} & -e^{-j\pi/16} \\ -e^{-j\pi/8} & e^{-j\pi/8} & -e^{-j\pi/8} & e^{-j\pi/8} \\ -e^{-j3\pi/16} & e^{-j3\pi/16} & e^{-j3\pi/16} & -e^{-j3\pi/16} \end{bmatrix}$ |
| 6 | $\begin{bmatrix} 1 & 1 & 1 & 1 \\ e^{-j\pi/16} & e^{-j\pi/16} & -e^{-j\pi/16} & -e^{-j\pi/16} \\ e^{-j\pi/8} & -e^{-j\pi/8} & e^{-j\pi/8} & -e^{-j\pi/8} \\ e^{-j3\pi/16} & e^{-j3\pi/16} & -e^{-j3\pi/16} & -e^{-j3\pi/16} \\ -j & j & -j & j \\ -e^{j7\pi/16} & e^{j7\pi/16} & e^{j7\pi/16} & -e^{j7\pi/16} \\ -e^{j3\pi/8} & e^{j3\pi/8} & e^{j3\pi/8} & -e^{j3\pi/8} \\ -e^{j5\pi/16} & e^{j5\pi/16} & e^{j5\pi/16} & -e^{j5\pi/16} \end{bmatrix}$ |
| 7 | $\begin{bmatrix} 1 & 1 & 1 & 1 \\ 1 & 1 & -1 & -1 \\ 1 & 1 & 1 & 1 \\ 1 & 1 & -1 & -1 \\ j & -j & j & -j \\ j & -j & -j & j \\ j & -j & j & -j \\ j & -j & -j & j \end{bmatrix}$ |
| 8 | $\begin{bmatrix} 1 & 1 & 1 & 1 \\ 1 & 1 & -1 & -1 \\ 1 & 1 & 1 & 1 \\ 1 & 1 & -1 & -1 \\ -1 & 1 & -1 & 1 \\ -1 & 1 & 1 & -1 \\ -1 & 1 & -1 & 1 \\ -1 & 1 & 1 & -1 \end{bmatrix}$ |

-continued

| Index | W2 |
|---|---|
| 9 | $\begin{bmatrix} 1 & 1 & 1 & 1 \\ 1 & 1 & -1 & -1 \\ 1 & 1 & 1 & 1 \\ 1 & 1 & -1 & -1 \\ -j & j & -j & j \\ -j & j & j & -j \\ -j & j & -j & j \\ -j & j & j & -j \end{bmatrix}$ |
| 10 | $\begin{bmatrix} 1 & 1 & 1 & 1 \\ e^{j\pi/16} & e^{j\pi/16} & -e^{j\pi/16} & -e^{j\pi/16} \\ e^{j\pi/8} & e^{j\pi/8} & e^{j\pi/8} & e^{j\pi/8} \\ e^{j3\pi/16} & e^{j3\pi/16} & -e^{j3\pi/16} & -e^{j3\pi/16} \\ j & -j & j & -j \\ -e^{-j7\pi/16} & e^{-j7\pi/16} & e^{-j7\pi/16} & -e^{-j7\pi/16} \\ -e^{-j3\pi/8} & e^{-j3\pi/8} & -e^{-j3\pi/8} & e^{-j3\pi/8} \\ -e^{-j5\pi/16} & e^{-j5\pi/16} & e^{-j5\pi/16} & -e^{-j5\pi/16} \end{bmatrix}$ |
| 11 | $\begin{bmatrix} 1 & 1 & 1 & 1 \\ e^{j\pi/16} & e^{j\pi/16} & -e^{j\pi/16} & -e^{j\pi/16} \\ e^{j\pi/8} & e^{j\pi/8} & e^{j\pi/8} & e^{j\pi/8} \\ e^{j3\pi/16} & e^{j3\pi/16} & -e^{j3\pi/16} & -e^{j3\pi/16} \\ -1 & 1 & -1 & 1 \\ -e^{j\pi/16} & e^{j\pi/16} & e^{j\pi/16} & -e^{j\pi/16} \\ -e^{j\pi/8} & e^{j\pi/8} & -e^{j\pi/8} & e^{j\pi/8} \\ -e^{j3\pi/16} & e^{j3\pi/16} & e^{j3\pi/16} & -e^{j3\pi/16} \end{bmatrix}$ |
| 12 | $\begin{bmatrix} 1 & 1 & 1 & 1 \\ e^{j\pi/16} & e^{j\pi/16} & -e^{j\pi/16} & -e^{j\pi/16} \\ e^{j\pi/8} & e^{j\pi/8} & e^{j\pi/8} & e^{j\pi/8} \\ e^{j3\pi/16} & e^{j3\pi/16} & -e^{j3\pi/16} & -e^{j3\pi/16} \\ -j & j & -j & j \\ e^{-j7\pi/16} & -e^{-j7\pi/16} & -e^{-j7\pi/16} & e^{-j7\pi/16} \\ e^{-j3\pi/8} & -e^{-j3\pi/8} & -e^{-j3\pi/8} & -e^{-j3\pi/8} \\ e^{-j5\pi/16} & -e^{-j5\pi/16} & -e^{-j5\pi/16} & e^{-j5\pi/16} \end{bmatrix}$ |
| 13 | $\begin{bmatrix} 1 & 1 & 1 & 1 \\ 1 & j & -1 & -j \\ 1 & -1 & 1 & -1 \\ 1 & -j & -1 & j \\ 1 & -j & -1 & j \\ j & -j & j & -j \\ -1 & -j & 1 & j \\ -j & -j & -j & -j \end{bmatrix}$ |
| 14 | $\begin{bmatrix} 1 & 1 & 1 & 1 \\ 1 & j & -1 & -j \\ 1 & -1 & 1 & -1 \\ 1 & -j & -1 & j \\ j & 1 & -j & -1 \\ -1 & 1 & -1 & 1 \\ -j & 1 & j & -1 \\ 1 & 1 & 1 & 1 \end{bmatrix}$ |

-continued

| Index | W2 |
|-------|-----|
| 15 | $\begin{bmatrix} 1 & 1 & 1 & 1 \\ 1 & j & -1 & -j \\ 1 & -1 & 1 & -1 \\ 1 & -j & -1 & j \\ -1 & j & 1 & -j \\ -j & j & -j & j \\ 1 & j & -1 & -j \\ j & j & j & j \end{bmatrix}$ |
| 16 | $\begin{bmatrix} 1 & 1 & 1 & 1 \\ 1 & j & -1 & -j \\ 1 & -1 & 1 & -1 \\ 1 & -j & -1 & j \\ -j & -1 & j & 1 \\ 1 & -1 & 1 & -1 \\ j & -1 & -j & 1 \\ -1 & -1 & -1 & -1 \end{bmatrix}$ |

Each entry of the second matrix can still be represented as $\exp\{j\pi p/(2N)\}$ where p is an integer between 0 and $2N-1$ ($N=16$). Note that one can again represent the final precoder W as:

$$W = W_1 W_2 = \begin{bmatrix} \text{diag}\{W_2(1:4,1)\}X_i & \text{diag}\{W_2(1:4,2)\}X_i & \text{diag}\{W_2(1:4,3)\}X_i & \text{diag}\{W_2(1:4,4)\}X_i \\ \beta_i \text{diag}\{W_2(5:8,1)\}X_i & \beta_i \text{diag}\{W_2(5:8,1)\}X_i & \beta_i \text{diag}\{W_2(5:8,3)\}X_i & \beta_i \text{diag}\{W_2(5:8,4)\}X_i \end{bmatrix}$$

In another embodiment, the codebook can also be constructed as follows

| Second Index | W (up to rank 4) |
|---|---|
| 1 | $U_k \begin{bmatrix} X_i & X_{i+4} & X_i & X_{i+4} \\ \alpha X_{i+4} & -\alpha X_i & -\alpha X_{i+4} & \alpha X_i \end{bmatrix}$, |
| 2 | |
| 3 | |
| 4 | |
| 5 | |
| 6 | $\begin{bmatrix} T_k X_i & T_k X_i & T_k X_{i+4} & T_k X_{i+4} \\ \alpha T_k X_i & -\alpha T_k X_i & \alpha T_k X_{i+4} & -\alpha T_k X_{i+4} \end{bmatrix}$, |
| 7 | |
| 8 | |
| 9 | $k \in \{1,2,3\}; \alpha \in \{\beta_i \times [+j, -1, -j]\}$ |
| 10 | |
| 11 | |
| 12 | |
| 13 | $\begin{bmatrix} X_i & X_{i+4} & X_i & X_{i+4} \\ \alpha X_{i+4} & -\alpha X_i & -\alpha X_{i+4} & \alpha X_i \end{bmatrix}$ |
| 14 | |
| 15 | |
| 16 | |
|  | $\alpha \in \{\pm 1, \pm j\}$ | where $X_i, X_{i+4}$ are used to approximate the dominant Eigen vectors of ULA, which are orthogonal for 8 Tx and size 16 DFT. The corresponding W2 codebook is given below, where W1 is defined above.

| Index | W2 |
|-------|-----|
| 1 | $\begin{bmatrix} 1 & 1 & 1 & 1 \\ e^{-j\pi/16} & e^{j7\pi/16} & e^{-j\pi/16} & e^{j7\pi/16} \\ e^{-j\pi/8} & -e^{-j\pi/8} & e^{-j\pi/8} & -e^{-j\pi/8} \\ e^{-j3\pi/16} & -e^{j5\pi/16} & e^{-j3\pi/16} & -e^{-j5\pi/16} \\ e^{-j\pi/4} & -e^{-j\pi/4} & -e^{-j\pi/4} & e^{-j\pi/4} \\ e^{-j5\pi/16} & -e^{j3\pi/16} & -e^{-j5\pi/16} & e^{-j3\pi/16} \\ e^{-j3\pi/8} & e^{-j3\pi/8} & -e^{-j3\pi/8} & -e^{-j3\pi/8} \\ e^{-j7\pi/16} & e^{j\pi/16} & -e^{-j7\pi/16} & -e^{j\pi/16} \end{bmatrix}$ |
| 2 | $\begin{bmatrix} 1 & 1 & 1 & 1 \\ 1 & j & 1 & j \\ 1 & -1 & 1 & -1 \\ 1 & -j & 1 & -j \\ 1 & -1 & -1 & 1 \\ 1 & -j & -1 & j \\ 1 & 1 & -1 & -1 \\ 1 & j & -1 & -j \end{bmatrix}$ |

-continued

| Index | W2 |
|-------|-----|
| 3 | $\begin{bmatrix} 1 & 1 & 1 & 1 \\ e^{j\pi/16} & e^{-j7\pi/16} & e^{j\pi/16} & -e^{j7\pi/16} \\ e^{j\pi/8} & -e^{j\pi/8} & e^{j\pi/8} & -e^{j\pi/8} \\ e^{j3\pi/16} & e^{-j5\pi/16} & e^{j3\pi/16} & e^{-j5\pi/16} \\ e^{j\pi/4} & -e^{j\pi/4} & -e^{j\pi/4} & e^{j\pi/4} \\ e^{j5\pi/16} & e^{-j3\pi/16} & -e^{j5\pi/16} & e^{-j3\pi/16} \\ e^{j3\pi/8} & e^{j3\pi/8} & -e^{j3\pi/8} & -e^{j3\pi/8} \\ e^{j7\pi/16} & -e^{-j\pi/16} & -e^{j7\pi/16} & e^{-j\pi/16} \end{bmatrix}$ |
| 4 | $\begin{bmatrix} 1 & 1 & 1 & 1 \\ e^{-j\pi/16} & e^{-j\pi/16} & e^{j7\pi/16} & e^{j7\pi/16} \\ e^{-j\pi/8} & e^{-j\pi/8} & -e^{-j\pi/8} & -e^{-j\pi/8} \\ e^{-j3\pi/16} & e^{-j3\pi/16} & -e^{j5\pi/16} & e^{j5\pi/16} \\ j & -j & j & -j \\ e^{j7\pi/16} & -e^{j7\pi/16} & -e^{-j\pi/16} & -e^{-j\pi/16} \\ e^{j3\pi/8} & -e^{j3\pi/8} & -e^{j3\pi/8} & e^{j3\pi/8} \\ e^{j5\pi/16} & -e^{j5\pi/16} & e^{-j3\pi/16} & -e^{-j3\pi/16} \end{bmatrix}$ |

| Index | W2 |
|---|---|
| 5 | $\begin{bmatrix} 1 & 1 & 1 & 1 \\ e^{-j\pi/16} & e^{-j\pi/16} & e^{j7\pi/16} & e^{j7\pi/16} \\ e^{-j\pi/8} & e^{-j\pi/8} & -e^{-j\pi/8} & -e^{-j\pi/8} \\ e^{-j3\pi/16} & e^{-j3\pi/16} & -e^{j5\pi/16} & -e^{j5\pi/16} \\ -1 & 1 & -1 & 1 \\ -e^{-j\pi/16} & e^{-j\pi/16} & -e^{j7\pi/16} & e^{j7\pi/16} \\ -e^{-j\pi/8} & e^{-j\pi/8} & e^{-j\pi/8} & -e^{-j\pi/8} \\ -e^{-j3\pi/16} & e^{-j3\pi/16} & e^{j5\pi/16} & -e^{j5\pi/16} \end{bmatrix}$ |
| 6 | $\begin{bmatrix} 1 & 1 & 1 & 1 \\ e^{-j\pi/16} & e^{-j\pi/16} & e^{j7\pi/16} & e^{j7\pi/16} \\ e^{-j\pi/8} & e^{-j\pi/8} & -e^{-j\pi/8} & -e^{-j\pi/8} \\ e^{-j3\pi/16} & e^{-j3\pi/16} & -e^{j5\pi/16} & -e^{j5\pi/16} \\ -j & j & -j & j \\ -e^{-j7\pi/16} & e^{j7\pi/16} & -e^{-j\pi/16} & -e^{-j\pi/16} \\ -e^{j3\pi/8} & e^{j3\pi/8} & e^{j3\pi/8} & -e^{j3\pi/8} \\ -e^{j5\pi/16} & e^{j5\pi/16} & -e^{-j3\pi/16} & e^{-j3\pi/16} \end{bmatrix}$ |
| 7 | $\begin{bmatrix} 1 & 1 & 1 & 1 \\ 1 & 1 & j & j \\ 1 & 1 & -1 & -1 \\ 1 & 1 & -j & -j \\ j & -j & j & -j \\ j & -j & -1 & 1 \\ j & -j & -j & j \\ j & -j & 1 & -1 \end{bmatrix}$ |
| 8 | $\begin{bmatrix} 1 & 1 & 1 & 1 \\ 1 & 1 & j & j \\ 1 & 1 & -1 & -1 \\ 1 & 1 & -j & -j \\ -1 & 1 & -1 & 1 \\ -1 & 1 & -j & j \\ -1 & 1 & 1 & -1 \\ -1 & 1 & j & -j \end{bmatrix}$ |
| 9 | $\begin{bmatrix} 1 & 1 & 1 & 1 \\ 1 & 1 & j & j \\ 1 & 1 & -1 & -1 \\ 1 & 1 & -j & -j \\ -j & j & -j & j \\ -j & j & 1 & -1 \\ -j & j & j & -j \\ -j & j & -1 & 1 \end{bmatrix}$ |
| 10 | $\begin{bmatrix} 1 & 1 & 1 & 1 \\ e^{j\pi/16} & e^{j\pi/16} & -e^{-j7\pi/16} & -e^{-j7\pi/16} \\ e^{j\pi/8} & e^{j\pi/8} & -e^{j\pi/8} & -e^{j\pi/8} \\ e^{j3\pi/16} & e^{j3\pi/16} & -e^{-j5\pi/16} & -e^{-j5\pi/16} \\ j & -j & j & -j \\ -e^{-j7\pi/16} & e^{-j7\pi/16} & -e^{j\pi/16} & e^{j\pi/16} \\ -e^{j3\pi/8} & e^{j3\pi/8} & -e^{j3\pi/8} & e^{j3\pi/8} \\ -e^{-j5\pi/16} & e^{-j5\pi/16} & e^{j3\pi/16} & -e^{j3\pi/16} \end{bmatrix}$ |
| 11 | $\begin{bmatrix} 1 & 1 & 1 & 1 \\ e^{j\pi/16} & e^{j\pi/16} & -e^{-j7\pi/16} & -e^{-j7\pi/16} \\ e^{j\pi/8} & e^{j\pi/8} & -e^{j\pi/8} & -e^{j\pi/8} \\ e^{j3\pi/16} & e^{j3\pi/16} & -e^{-j5\pi/16} & -e^{-j5\pi/16} \\ -1 & 1 & -1 & 1 \\ -e^{j\pi/16} & e^{j\pi/16} & e^{-j7\pi/16} & -e^{-j7\pi/16} \\ -e^{j\pi/8} & e^{j\pi/8} & e^{j\pi/8} & -e^{j\pi/8} \\ -e^{j3\pi/16} & e^{j3\pi/16} & -e^{-j5\pi/16} & -e^{-j5\pi/16} \end{bmatrix}$ |
| 12 | $\begin{bmatrix} 1 & 1 & 1 & 1 \\ e^{j\pi/16} & e^{j\pi/16} & -e^{-j7\pi/16} & -e^{-j7\pi/16} \\ e^{j\pi/8} & e^{j\pi/8} & -e^{j\pi/8} & -e^{j\pi/8} \\ e^{j3\pi/16} & e^{j3\pi/16} & -e^{-j5\pi/16} & -e^{-j5\pi/16} \\ -j & j & -j & j \\ e^{-j7\pi/16} & -e^{-j7\pi/16} & e^{j\pi/16} & -e^{j\pi/16} \\ e^{-j3\pi/8} & -e^{-j3\pi/8} & -e^{-j3\pi/8} & e^{-j3\pi/8} \\ e^{-j5\pi/16} & -e^{-j5\pi/16} & -e^{j3\pi/16} & e^{j3\pi/16} \end{bmatrix}$ |
| 13 | $\begin{bmatrix} 1 & 1 & 1 & 1 \\ 1 & j & 1 & j \\ 1 & -1 & 1 & -1 \\ 1 & -j & 1 & -j \\ 1 & -1 & -1 & 1 \\ j & -1 & -j & 1 \\ -1 & -1 & 1 & 1 \\ -j & -1 & j & 1 \end{bmatrix}$ |
| 14 | $\begin{bmatrix} 1 & 1 & 1 & 1 \\ 1 & j & 1 & j \\ 1 & -1 & 1 & -1 \\ 1 & -j & 1 & -j \\ j & -j & -j & j \\ -1 & -j & 1 & j \\ -j & -j & j & j \\ 1 & -j & -1 & j \end{bmatrix}$ |
| 15 | $\begin{bmatrix} 1 & 1 & 1 & 1 \\ 1 & j & 1 & j \\ 1 & -1 & 1 & -1 \\ 1 & -j & 1 & -j \\ -1 & 1 & 1 & -1 \\ -j & 1 & j & -1 \\ 1 & 1 & -1 & -1 \\ j & 1 & -j & -1 \end{bmatrix}$ |
| 16 | $\begin{bmatrix} 1 & 1 & 1 & 1 \\ 1 & j & 1 & j \\ 1 & -1 & 1 & -1 \\ 1 & -j & 1 & -j \\ -j & j & j & -j \\ 1 & j & -1 & -j \\ j & j & -j & -j \\ -1 & j & 1 & -j \end{bmatrix}$ |

The above discussion on the precoder structure is tied to feedback method in this invention. In the feedback scheme for a wireless communication device to send a first representation of a first matrix chosen from a first codebook, wherein the first matrix is a N-by-N diagonal matrix with the k-th diagonal elements being $\sigma^*\exp(j\pi(k-1)m/N)$, N being the number of antennas, m being an integer chosen between 0 and N−1 by the wireless communication device, and o being a complex valued constant including "1". The wireless communication device also sends a second representation of a second N-by-R matrix chosen from a second codebook, with R being the number of spatial layers; wherein the first representation and the second representation together convey a precoder matrix as the matrix product of the first and second matrix.

The first representation is an index of the chosen matrix in the first codebook and the second representation is an index of the chosen matrix in the second codebook. The first matrix $W_1$ can correspond to a frequency band, and the second matrix $W_2$ corresponds to a frequency sub-band within the frequency band wherein the first representation and the second representation together convey the precoder matrix of one or more vectors associated with one or more spatial layers, and the precoder matrix corresponds to the frequency sub-band. $W_1$ can be computed from the spatial covariance matrix of the channel corresponding to the frequency band.

Figure 7:
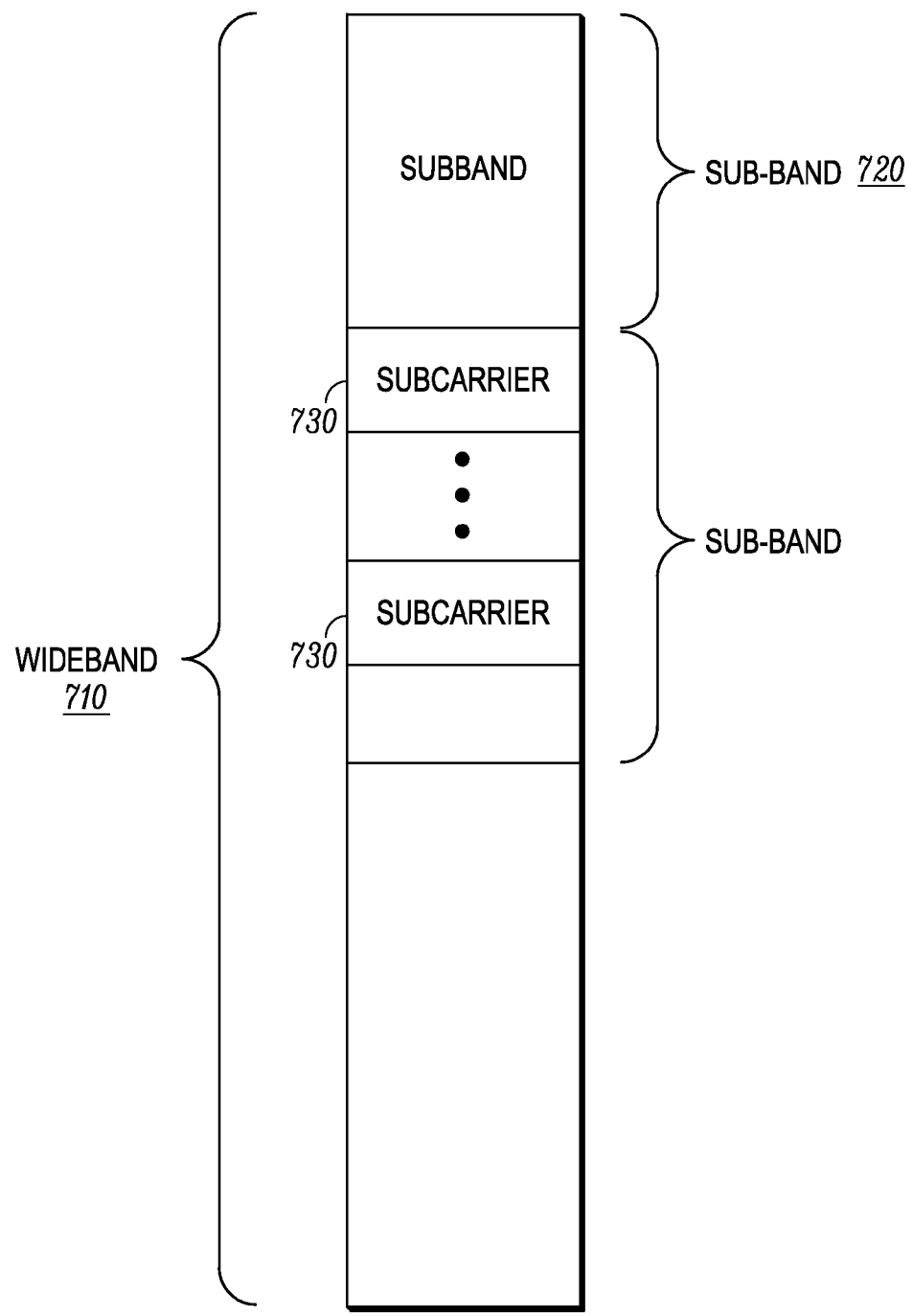
FIG. 7 illustrates a wideband and sub-bands, each of which is further composed of contiguous subcarriers.

The above embodiment is illustrated in FIG. 7. The first component could correspond to a wideband matrix $W_1^{WB}$ corresponding to the whole bandwidth 710, which is composed of one or more sub-bands 720. Each subband 720 is composed of a set of contiguous subcarriers 730 or in LTE, a set of RBs, which is the minimum scheduling/feedback granularity. A second matrix $W_2^b$ corresponds to a to a band 'b'. The precoder for a band 'b', represented as $W^b$ is obtained as a function of $W_1^{WB}$ and $W_2^b$. A preferred example of the function as described above is W1×W2. A UE is required to feedback the wideband precoder/matrix for the whole band and the subband precoder/matrix for each subband.

An exemplary embodiment of the above may be obtained, when a wireless communication device is requested preferred precoder feedback for both a set of sub-bands and the wideband. In such a case, the device feedbacks a first matrix $W_1^{WB}$ and second matrices $W_2^b$ corresponding to each sub-band. In addition it feedbacks an additional second matrix corresponding to the whole wideband $W_2^{wb}$, such that the precoder obtained as the product $W_1^{WB} W_2^{wb}$ can be used as a wideband precoder for all the sub-bands. This may be useful as a fallback option, for example, if the transmitted determines that the subband feedback is too outdated from the last report. Further, $W_2^{wb}$ may be selected from only a subset of the possible elements in the W2 codebook, which can be referred to as a subset codebook. Such a subset may be pre-defined or explicitly indicated or indicated from a set of predefined subsets to the wireless device.

Similarly, a transmitter may prefer to reduce feedback overhead by requesting the wireless device to restrict W1 or W2 to a subset based on an antenna configuration deployed. An exemplary subset that may be suitable if the antenna configuration is N-Tx ULA is {1, 2, 3}, and if it is a N-Tx cross-pol with two N/2 ULA sub-arrays is {2, 7, 8, 9}.

In a generalization of the above two embodiments, a subset restriction may also be defined based on the W1 index. In the other words, the subset of valid W2 indices may be dependent on the W1 index.

For the purpose of discussion, we will assume the long-term/correlated component corresponds to a wide frequency band such as the whole system bandwidth and the short-term component corresponds to a subband/narrowband that is composed of a set of contiguous subcarriers and is a part of the wideband.

The second matrix is chosen from a subset of the second codebook. It can be useful for a combined report of $W_1$ and $W_2$ to represent a precoder suitable for the entire frequency band, using minimal feedback overhead.

The two-component feedback conveys the information of a precoder matrix recommended by the user to the base station. The actual precoder used by the base station may be different from the suggested precoder, but the actual precoder is derived from the recommended feedback.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method for a wireless communication device to send a precoder matrix information to a base station, the method comprising:

the wireless communication device sending a first representation of a first matrix chosen from a first codebook, wherein the first matrix is a N-by-N diagonal matrix with the k-th diagonal elements being $\sigma 1^*\exp(j\pi(k-1)m/N)$, for k from 1 to N/2 and being $\sigma 2^*\exp(j\pi(k-N/2-1)m/N)$ for k from N/2+1 to N, N being a number of antennas, m is an integer between 0 and N-1, and $\sigma 1$, $\sigma 2$ being complex valued scalars;

the wireless communication device sending a second representation of a second N-by-R matrix chosen from a second codebook, with R being a number of spatial layers;

wherein the first representation and the second representation together convey a precoder matrix as a matrix product of the first matrix and the second matrix.

2. The method in claim 1, wherein $\sigma 1$ and $\sigma 2$ are chosen such that the first matrix is a N-by-N diagonal matrix with the k-th diagonal elements being $\sigma^*\exp(j\pi(k-1)m/N)$, N being the number of antennas, m is an integer between 0 and N−1, and a being a complex valued constant including "1" and common to the whole first codebook.

3. The method in claim 1, the wireless communication device sending the first representation of the first matrix chosen from the first codebook, wherein the first representation is an index of the chosen matrix in the first codebook.

4. The method in claim 1, the wireless communication device sending the second representation of the second matrix chosen from the second codebook, wherein the second representation is an index of the chosen matrix in the second codebook.

5. The method of claim 1, the wireless communication device sending the first representation of the first matrix chosen from the first codebook, wherein the first codebook includes diagonal matrices formed from a set of unique DFT vectors.

6. The method of claim 1, wherein each entry of the second matrix can be represented as $\exp\{j\pi p/(2N)\}$ where p is an integer between 0 and 2N−1.

7. The method of claim 1, the wireless communication device sending the second representation of the second matrix chosen from the second codebook, wherein a number of columns of the second matrix corresponds to a number of transmitted spatial layers that the wireless communicate device supports.

8. The method in claim 1, wherein the diagonal elements of the first matrix is the concatenation of a first DFT vector of length-N/2 and a scaled version of a second DFT vector of length-N/2, where in the scaling can be a unit magnitude complex value including "1".

9. The method in claim 8, wherein
the first DFT vector of length N/2 are further rotated by entries in the first N/2 rows of the second matrix to obtain a first sub-matrix corresponding to the first N/2 antenna elements, wherein each column corresponds to each of R spatial layers; and
the second DFT vector of length N/2 are further rotated by entries of the second N/2 rows of the second matrix entries to obtain a second sub-matrix corresponding to the second N/2 antenna elements, wherein each column corresponds to each of R spatial layers; and
the precoder matrix is the row-wise concatenation of first and second sub-matrices, where the first N/2 rows are the first sub-matrix and the second N/2 rows are the second sub-matrix.

10. The method in claim 9, further comprising the wireless communication device selecting the second matrix so that the first sub-matrix of the precoder matrix contains orthogonal columns.

11. The method in claim 9, further comprising the wireless communication device selecting the second matrix so that the first sub-matrix of the precoder matrix contains non-orthogonal columns.

12. The method in claim 9, further comprising the wireless communication device selecting the second matrix so that the column vectors corresponding to the same spatial layer in the first sub-matrix and second sub-matrix are equivalent, up to a real or complex scaling factor.

13. The method in claim 9, further comprising the wireless communication device selecting the second matrix so that column vectors corresponding to the same spatial layer in the first sub-matrix and second sub-matrix are not equivalent, up to a real or complex scaling factor.

14. The method in claim 9, further comprising the wireless communication device selecting the second matrix so that at least two columns of the first sub-matrix corresponding to at least two different spatial layers are the same.

15. The method in claim 9, further comprising the wireless communication device selecting the second matrix so that at least one column of the second sub-matrix corresponding to a spatial layer is the negation of another column of the second sub-matrix corresponding to another spatial layer.

16. The method in claim 9, further comprising the wireless communication device selecting the second matrix so that the first sub-matrix contains orthogonal columns and second sub-matrix contains orthogonal columns.

17. The method in claim 9, further comprising the wireless communication device selecting the second matrix so that the first sub-matrix contains non-orthogonal columns and second sub-matrix contains non-orthogonal columns.

18. The method in claim 1, the wireless communication device sending the first representation of the first matrix chosen from the first codebook, wherein the first matrix is computed from a spatial covariance matrix of a channel corresponding to a frequency band.

19. The method of claim 1, the wireless communication device sending the second representation of the second matrix chosen from the second codebook, wherein the second matrix is chosen from a subset of the second codebook.

20. The method of claim 1 further comprising
the wireless communication device sending the first representation of the first matrix, wherein the first matrix corresponds to a frequency band;
the wireless communication device sending the second representation of the second matrix, wherein the second matrix corresponds to a frequency sub-band within the frequency band;
wherein the first representation and the second representation together convey the precoder matrix of one or more vectors associated with one or more spatial layers, and the precoder matrix corresponds to the frequency sub-band.

* * * * *